(12) United States Patent
Trpkovski et al.

(10) Patent No.: US 6,916,392 B2
(45) Date of Patent: Jul. 12, 2005

(54) PRODUCING AND SERVICING INSULATING GLASS UNITS

(75) Inventors: Paul Trpkovski, Loganville, WI (US); Bernard J. Herron, Bloomington, MN (US)

(73) Assignee: Cardinal IG Company, Eden Prairie, MN (US)

( * ) Notice: Subject to any disclaimer, the term of this patent is extended or adjusted under 35 U.S.C. 154(b) by 0 days.

(21) Appl. No.: 10/118,853

(22) Filed: Apr. 9, 2002

(65) Prior Publication Data

US 2002/0197422 A1 Dec. 26, 2002

Related U.S. Application Data

(60) Provisional application No. 60/299,862, filed on Jun. 21, 2001.

(51) Int. Cl.[7] .................. B32B 17/00; C03C 27/00; B65B 31/00
(52) U.S. Cl. .................. 156/104; 156/109; 141/59; 141/63; 141/66; 141/67; 53/403; 53/408
(58) Field of Search .................. 156/104, 105, 156/109, 286; 141/48, 49, 59, 66, 63, 67; 53/403, 408

(56) References Cited

U.S. PATENT DOCUMENTS

| | | | |
|---|---|---|---|
| 2,125,372 A | 8/1938 | Fox | 20/56.5 |
| 2,302,740 A | 11/1942 | Boicey | 20/56.5 |
| 2,686,342 A | 8/1954 | D'Eustachio | 20/56.5 |
| 2,734,601 A | 2/1956 | Anderson | 189/75 |
| 2,749,579 A | 6/1956 | Shaw | 20/56.5 |
| 2,756,467 A | 7/1956 | Etling | 20/56.5 |
| 2,880,475 A | 4/1959 | Mills | 20/56.5 |
| 2,886,864 A | 5/1959 | Boicey et al. | 20/56.5 |
| 2,887,737 A | 5/1959 | Prescott | 20/56.5 |
| 2,964,809 A | 12/1960 | Gwyn et al. | 20/56.5 |
| 3,027,607 A | 4/1962 | Badger et al. | 20/56.5 |
| 3,078,627 A | 2/1963 | Dunipace et al. | 53/7 |
| 3,483,735 A | 12/1969 | Packo | 73/40.7 |
| 3,793,167 A | 2/1974 | Glaser | 204/298 |
| 3,935,351 A | 1/1976 | Franz | 428/34 |
| 3,993,520 A | 11/1976 | Werner et al. | 156/94 |

(Continued)

FOREIGN PATENT DOCUMENTS

| | | | |
|---|---|---|---|
| AT | 200310 | 10/1958 | 37/8 |
| BE | 904527 A | 7/1986 | |
| BE | 904527 | 7/1986 | |
| DE | 1683103 | 1/1970 | E06B/3/66 |
| DE | 28 22 413 A1 | 12/1979 | C03C/27/12 |
| DE | G 82 05 852.0 | 12/1982 | C03C/27/12 |
| DE | 19546704 | 6/1997 | E04B/1/70 |
| DE | 19611245 | 9/1997 | E06B/3/677 |
| EP | 0269194 | 6/1988 | E06B/3/66 |
| EP | 0 645 516 A2 | 9/1994 | E06B/3/677 |
| FR | 2478184 | 9/1981 | E06B/7/12 |
| GB | 560000 | 3/1944 | |
| GB | 997856 | 7/1965 | |

*Primary Examiner*—Donald J. Loney
(74) *Attorney, Agent, or Firm*—Fredrickson & Byron, P.A.

(57) ABSTRACT

The invention provides methods of producing and servicing insulating glass units. Methods are provided for reducing the pressure differential on an IG unit, for changing the interior pressure within an IG unit, and for changing the gaseous interior composition within an IG. These methods can be practiced by forming a hole through at least one of the panes of an IG unit, and flowing gas through the hole. One method includes forming a hole through one of the panes of an IG unit, flowing gas through the hole, and sealing the hole with an optically clear sealant (e.g., a transparent resin). A number of methods for producing IG units are also provided. Further, several kits are provided for servicing IG units. There is also provided a method for detecting leaks in an IG unit by flowing an opaque gas into the unit and observing the unit to detect leaks of the opaque gas therefrom.

66 Claims, 8 Drawing Sheets

U.S. PATENT DOCUMENTS

| | | | |
|---|---|---|---|
| 4,026,512 A | 5/1977 | Holt ............................ 249/141 |
| 4,204,029 A | 5/1980 | Batchelor et al. ............ 428/441 |
| 4,335,166 A | 6/1982 | Lizardo et al. ................ 428/34 |
| 4,369,084 A | 1/1983 | Lisec ......................... 156/382 |
| 4,476,169 A | 10/1984 | Nishino et al. ............... 428/34 |
| 4,483,108 A | 11/1984 | Howard ........................ 51/283 |
| 4,497,476 A | 2/1985 | Wiele ............................. 269/1 |
| 4,520,602 A | 6/1985 | Miller ...................... 52/173 R |
| 4,567,703 A | 2/1986 | Ricks ........................... 52/304 |
| 4,587,784 A | 5/1986 | Chavy et al. .................. 52/304 |
| 4,592,179 A | 6/1986 | Boutarin ...................... 52/172 |
| 4,597,727 A | 7/1986 | Birkhauser, III ............. 425/12 |
| 4,780,164 A | 10/1988 | Rueckheim et al. ........ 156/104 |
| 4,781,878 A | 11/1988 | Lisec .......................... 264/267 |
| 4,817,354 A | 4/1989 | Bayer .......................... 52/302 |
| 4,886,095 A | 12/1989 | Lisec ............................ 141/4 |
| 4,909,874 A | 3/1990 | Rueckheim ................. 156/109 |
| 4,932,608 A | 6/1990 | Heidish et al. .......... 244/129.3 |
| 4,941,302 A | 7/1990 | Barry .......................... 52/171 |
| 5,017,252 A | 5/1991 | Aldrich et al. .............. 156/109 |
| 5,069,836 A | 12/1991 | Werner et al. ................. 264/36 |
| 5,107,698 A | 4/1992 | Gilliam ...................... 73/40.7 |
| 5,299,399 A | 4/1994 | Baier et al. .............. 52/204.52 |
| 5,313,761 A | 5/1994 | Leopold ...................... 52/788 |
| 5,345,734 A | 9/1994 | Tremblay ................ 52/204.52 |
| 5,350,469 A | 9/1994 | Lenhardt et al. ............ 156/102 |
| 5,366,574 A | 11/1994 | Lenhardt et al. ............ 156/102 |
| 5,368,181 A | 11/1994 | Myers ........................ 220/303 |
| 5,377,473 A | 1/1995 | Narayan et al. .............. 52/790 |
| 5,439,716 A | 8/1995 | Larsen ........................ 428/34 |
| 5,454,893 A | * 10/1995 | Dietz ........................ 156/104 |
| 5,573,618 A | 11/1996 | Rueckheim ................. 156/104 |
| 5,596,151 A | 1/1997 | Rossini ................... 73/861.55 |
| 5,626,712 A | 5/1997 | Lisec .......................... 156/497 |
| 5,643,644 A | 7/1997 | Demars ...................... 428/34 |
| 5,645,678 A | 7/1997 | Lisec .......................... 156/382 |
| 5,676,782 A | 10/1997 | Lisec .......................... 156/382 |
| 5,679,419 A | 10/1997 | Larsen ........................ 428/34 |
| 5,705,010 A | 1/1998 | Larsen ...................... 156/196 |
| 5,714,214 A | 2/1998 | Larsen ........................ 428/34 |
| 5,735,318 A | 4/1998 | Vianello ...................... 141/67 |
| 5,753,069 A | 5/1998 | Rueckheim ................. 156/382 |
| 5,753,800 A | 5/1998 | Gilliam ...................... 73/40.7 |
| 5,762,739 A | 6/1998 | Lenhardt et al. ............. 156/109 |
| 5,855,638 A | 1/1999 | Demars ........................ 65/34 |
| 5,859,363 A | 1/1999 | Gouge ........................ 73/40.7 |
| 5,878,538 A | 3/1999 | Rossini ..................... 52/171.3 |
| 5,922,944 A | 7/1999 | Pieroni et al. ............... 73/40.7 |
| 5,957,169 A | 9/1999 | Trpkovski .................... 141/63 |
| 6,018,615 A | 1/2000 | Loblick ...................... 392/397 |
| 6,054,195 A | 4/2000 | Collins et al. ................ 428/34 |
| 6,142,009 A | 11/2000 | Loblick ...................... 73/40.7 |
| 6,158,483 A | 12/2000 | Trpkovski .................... 141/63 |
| 6,190,150 B1 | 2/2001 | Beveridge ..................... 425/11 |
| 6,216,751 B1 | 4/2001 | Trpkovski ...................... 141/7 |
| 6,378,254 B1 | 4/2002 | Gould ..................... 52/204.63 |
| 6,463,706 B1 | 10/2002 | Guhl et al. .............. 52/204.62 |

* cited by examiner

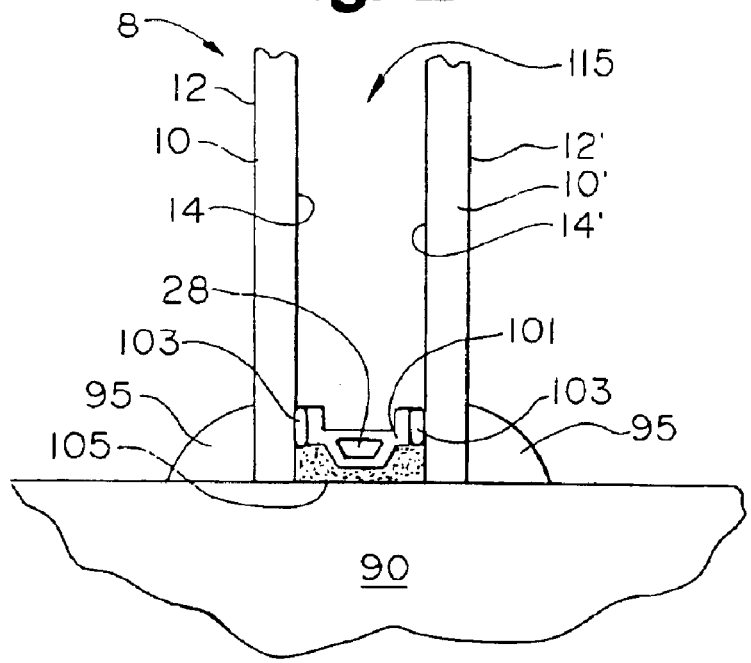
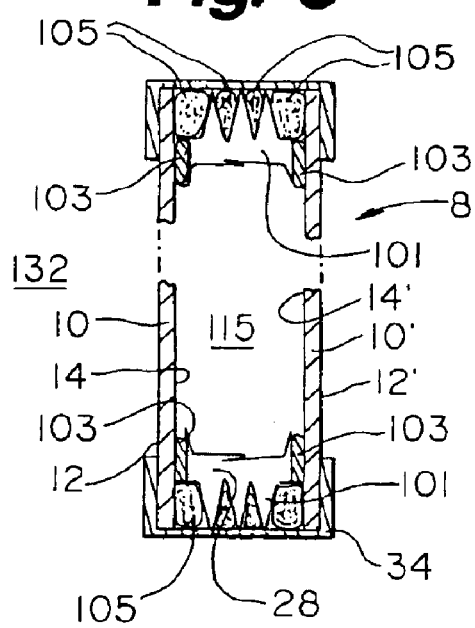
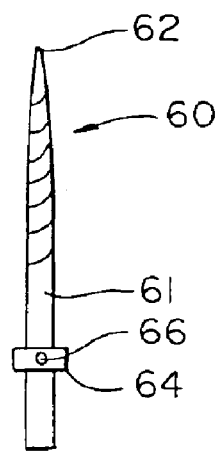

PRODUCING AND SERVICING INSULATING GLASS UNITS

CROSS REFERENCE TO RELATED APPLICATIONS

The present application is a continuation of provisional U.S. patent application filed Jun. 21, 2001 and assigned Ser. No. 60/299,862, the entire disclosure of which is incorporated herein by reference.

FIELD OF THE INVENTION

The present invention relates generally to insulating glass units. More specifically, the invention relates to methods and devices for producing and servicing insulating glass units.

BACKGROUND OF THE INVENTION

An insulating glass unit (i.e., an "IG unit" or "IGU") typically includes a pair of generally parallel panes held in a spaced-apart relationship by a spacer. FIG. 1 illustrates the basic structure of a conventional double-glazed IG unit 8. The peripheral inner surfaces of the panes 10, 10' are joined by a spacer 101 to define a between-pane space 115. While many standard IG units simply contain air, high performance IG units are sometimes filled with insulative gas to increase the insulating capacity of the units. Whether an IG unit is filled with insulative gas or air, it is conventional in the art to provide the gas fill at a pressure that is approximately atmospheric.

Filling the between-pane space of an IG unit with insulative gas advantageously increases the "R" value (i.e., the resistance to heat flow through the unit) of the resulting unit. Ideally, the between-pane space is filled with a gas that is heavier and less thermally conductive than air. Argon is commonly used as an insulative gas fill. Krypton is an even better insulator than argon. However, it is also significantly more expensive. Other inert gases can be used as well. Useful methods and devices for filling IG units with insulative gas are disclosed in U.S. Pat. Nos. 5,957,169 and 6,158,483, both issued to Trpkovski, the entire teachings of each of which are incorporated herein by reference.

Over time, insulative gas can slowly leak out of the between-pane space of an IG unit to the ambient exterior atmosphere. This is believed to occur at a greater rate than the permeation of air into the gas space. For example, it has been reported that certain sealants allow argon permeation at a rate that is two to three times that of the gases in air (e.g., oxygen and nitrogen). Thus, the pressure within the between-pane space of an IG unit can, over time, drop below atmospheric pressure. The resulting pressure differential can cause the panes to cup inwardly. A cupped (or "thin") IG unit suffers a loss of insulating value, due to the decreased thickness of the unit. A cupped IG unit also tends to have a distorted appearance. For example, the panes of such an IG unit can have a bent, curved, or dented appearance. In extreme cases, the panes of a cupped IG unit can eventually touch near their centers, forming a thermal bridge across the unit. This brings about an even greater loss of insulating value. In particularly extreme cases, a cupped IG unit may even implode. Of course, efforts are made to replace cupped IG units before this stage is reached.

Replacing an IG unit is expensive and time consuming. First of all, the cost of the replacement unit can be quite substantial. Moreover, IG units must be removed, replaced, and reinstalled on a unit-by-unit basis. Thus, the labor and time required to replace an IG unit is also substantial. This is perhaps best understood with reference to FIG. 2, which illustrates a very simple frame 90 on which an IG unit 8 is mounted. It can be appreciated that the trim 95 on one side of the IG unit 8 would have to be taken out before the unit 8 could be removed from the frame 90. A replacement IG unit could then be positioned against the remaining trim and secured in position by re-attaching the removed trim. It can also be appreciated that removing and replacing an IG unit increases the risk of damage to the frame, trim, and other nearby structure.

Replacement of an IG unit may also be necessitated when the pressure within the unit exceeds atmospheric pressure. For example, IG units are sometimes installed in geographic locations of high elevation and, hence, reduced atmospheric pressure. The panes of such IG units tend to bulge outwardly due to the positive pressure differential across the panes. A bulged (or "fat") unit may be more likely to experience seal failure than an IG unit filled to atmospheric pressure. For example, the pressure differential on a bulged unit places increased stress on the seals between the spacer and the panes. Over time, this may cause or contribute to seal failure. In particularly extreme cases, one or both of the panes of a bulged IG unit may even shatter. As with cupped IG units, efforts are made to replace bulged IG units before this stage is reached.

It would be desirable to provide methods and devices for replacing, adding, or adjusting the gaseous atmosphere within an IG unit. It would be particularly desirable to do so without having to remove the IG unit from any structure to which it is mounted.

SUMMARY OF THE INVENTION

In one embodiment, the invention provides a method of servicing an insulating glass unit. The insulating glass unit includes a pair of spaced-apart panes and a spacer joining peripheral confronting inner surfaces of the panes. The spacer and the confronting inner surfaces of the panes together define a between-pane space. The between-pane space contains a gaseous interior composition at an interior pressure that is different than the ambient exterior pressure outside the panes, such that a pressure differential exists between the interior pressure and the exterior pressure. The method comprises forming a hole through one of the panes and flowing gas through this hole to reduce the pressure differential.

In another embodiment, the invention provides a method of servicing an insulating glass unit. The insulating glass unit includes a pair of spaced-apart panes and a spacer joining peripheral confronting inner surfaces of the panes. The spacer and the confronting inner surfaces of the panes together define a between-pane space containing a first gaseous interior composition. The method comprises forming a first hole through one of the panes and flowing gas through this first hole to establish a second gaseous interior composition within the between-pane space of the insulating glass unit.

In still another embodiment, the invention provides a method of servicing an insulating glass unit. The insulating glass unit includes a pair of spaced-apart panes and a spacer joining peripheral confronting inner surfaces of the panes. The spacer and the confronting inner surfaces of the panes together define a between-pane space having a first gaseous interior pressure. The method comprises forming a hole through one of the panes and flowing gas through this hole to change the first gaseous interior pressure to a second gaseous interior pressure.

In yet another embodiment, the invention provides a method of servicing an insulating glass unit. The insulating glass unit includes a pair of spaced-apart panes and a spacer joining peripheral confronting inner surfaces of the panes. The spacer and the confronting inner surfaces of the panes together define a between-pane space. The method comprises forming a hole through one of the panes and flowing insulative gas through this hole and into the between-pane space of the insulating glass unit.

In a further embodiment, the invention provides a method of servicing an insulating glass unit. The insulating glass unit includes a pair of spaced-apart panes and a spacer joining peripheral confronting inner surfaces of the panes. The spacer and the confronting inner surfaces of the panes together define a between-pane space. At least one of the panes of the insulating glass unit has a hole formed therethrough. The method comprises sealing the hole with a substantially transparent resin.

In another embodiment, the invention provides an insulating glass unit comprising a pair of spaced-apart panes and a spacer joining peripheral confronting inner surfaces of the panes. The spacer and the confronting inner surfaces of the panes together define a between-pane space. At least one of the panes of the insulating glass unit has a hole formed therethrough. The hole is at least partially filled with a substantially transparent resin.

In still another embodiment, the invention provides a method of servicing an insulating glass unit. The insulating glass unit includes a pair of spaced-apart panes and a spacer joining peripheral confronting inner surfaces of the panes. The spacer and the confronting inner surfaces of the panes together define a between-pane space. The method comprises forming a hole through one of the panes by drilling an initial length of the hole with a fine point drill bit, drilling an intermediate length of the hole with a ball point drill bit, and drilling a final length of the hole with a fine point drill bit.

In yet another embodiment, the invention provides a method of servicing an insulating glass unit. The insulating glass unit includes a pair of spaced-apart panes and a spacer joining peripheral confronting inner surfaces of the panes. The spacer and the confronting inner surfaces of the panes together define a between-pane space. The method comprises forming a hole having a diameter of less than 0.0625 inch through one of the panes, flowing gas through the hole, and sealing the hole with an optically clear sealant.

In a further embodiment, the invention provides a method of producing an insulating glass unit, wherein the insulating glass unit includes a pair of spaced-apart panes and a spacer joining peripheral confronting inner surfaces of the panes. The spacer and the confronting inner surfaces of the panes together define a between-pane space. The method comprises forming a hole through one of the panes, and transporting the insulating glass unit having this hole to a customer or to a building site.

In another embodiment, the invention provides a kit comprising an insulating glass unit, wherein the insulating glass unit includes a pair of spaced-apart panes and a spacer joining peripheral confronting inner surfaces of the panes. The spacer and the confronting inner surfaces of the panes together define a between-pane space. The insulating glass unit has a hole formed through at least one of its panes. The kit includes a supply of insulative gas for filling the between-pane space of the insulating glass unit and further includes a supply of sealant for sealing the hole.

In still another embodiment, the invention provides a method of producing an insulating glass unit, wherein the insulating glass unit includes a pair of spaced-apart panes and a spacer joining peripheral confronting inner surfaces of the panes. The spacer and the confronting inner surfaces of the panes together define a between-pane space. The method comprises transporting the insulating glass unit to a customer or to a building site along with a servicing kit. The servicing kit includes a supply of insulative gas for filling the between-pane space of the insulating glass unit and a supply of substantially transparent resin.

In yet another embodiment, the invention provides a kit comprising an insulating glass unit, wherein the insulating glass unit includes a pair of spaced-apart panes and a spacer joining peripheral confronting inner surfaces of the panes. The spacer and the confronting inner surfaces of the panes together define a between-pane space. The kit includes a supply of insulative gas for filling the between-pane space of the insulating glass unit and further includes a supply of substantially transparent resin.

In a further embodiment, the invention provides a method of producing an insulating glass unit, wherein the insulating glass unit includes a pair of spaced-apart panes and a spacer joining peripheral confronting inner surfaces of the panes. The spacer and the confronting inner surfaces of the panes together define a between-pane space. The method comprises forming a hole through one of the panes, flowing insulative gas through this hole and into the between-pane space of the insulating glass unit, and applying a temporary sealant to the hole.

In another embodiment, the invention provides a kit for servicing an insulating glass unit, wherein the insulating glass unit includes a pair of spaced-apart panes and a spacer joining peripheral confronting inner surfaces of the panes. The spacer and the confronting inner surfaces of the panes together define a between-pane space. The kit comprises a hole-forming device for forming a hole through one of the panes of the insulating glass unit, a supply of insulative gas for filling the between-pane space of the insulating glass unit, and a supply of sealant for sealing such hole.

In still another embodiment, the invention provides a method of servicing an insulating glass unit, wherein the insulating glass unit includes a pair of spaced-apart panes and a spacer joining peripheral confronting inner surfaces of the panes. The spacer and the confronting inner surfaces of the panes together define a between-pane space. The method comprises flowing an opaque gas into the between-pane space of the insulating glass unit, and observing the insulating glass unit for leakage of the opaque gas.

BRIEF DESCRIPTION OF THE DRAWINGS

FIG. 2 is a cross-sectional side view of an insulating glass unit mounted on a frame;

FIG. 3 is a fragmentary, cross-sectional side view of an insulating glass unit assembly;

FIG. 4 is a side view of a drill bit suitable for forming a hole in a pane of an insulating glass unit in accordance with certain embodiments of the present invention;

DESCRIPTION OF PREFERRED EMBODIMENTS

Figure 1:
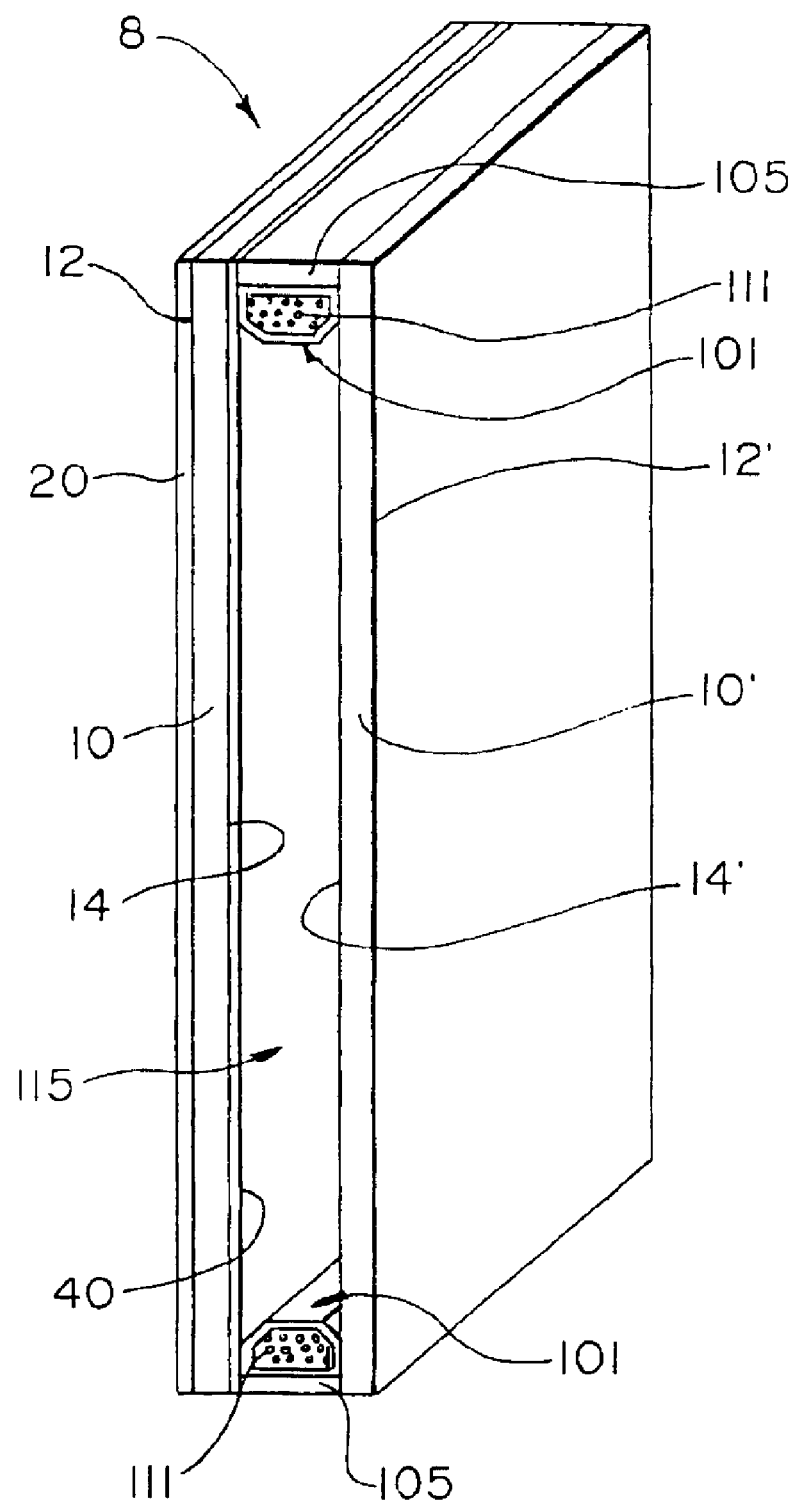
FIG. 1 is a perspective view of an insulating glass unit.

The following detailed description is to be read with reference to the drawings, in which like elements in different drawings have been given like reference numerals. The drawings, which are not necessarily to scale, depict selected embodiments and are not intended to limit the scope of the invention. Skilled artisans will recognize that the examples provided in the present disclosure have many suitable alternatives that can be utilized, and which fall within the scope of the invention.

FIG. 3 illustrates one example of an IG unit 8 that can be provided in the present invention. It is to be understood that this invention is not limited to practice with any particular type of IG unit. To the contrary, all aspects of the invention can be practiced with insulating glass units of all types. Thus, the details of the illustrated IG units should not be construed as limiting the scope of the invention. Moreover, it is to be understood that, while the term insulating "glass" unit is used throughout the present disclosure, the panes 10, 10' need not be formed of glass. Rather, any sheet-like panes can be used.

In certain preferred embodiments, the invention is practiced with an insulating glass unit having spaced-apart panes joined at their peripheries by a discrete spacer. This spacer may be formed of non-vitreous material, such as metal. In these preferred embodiments, it is to be understood that the edges of the panes are not fused directly together, as are the edges of the panes of all-glass IG units. Further, certain embodiments of the invention involve IG units that do not contain pillars or any other supports spaced about between the panes of each unit. In these embodiments, the between-pane space contains a gaseous atmosphere/has a gaseous interior pressure (before and after performing the method of the invention), rather than having an evacuated between-pane space.

The IG unit 8 of FIG. 3 includes a first pane 10 and a second pane 10' together forming a pair of spaced-apart panes. The panes bound a between-pane space 115 (i.e., an "inter-pane space" or "gas space") therebetween and an exterior space 132 thereabout. The exterior space 132 will typically comprise the ambient exterior atmosphere. As noted above, the panes are preferably spaced apart in a substantially parallel relationship by a spacer 101. The peripheral confronting inner surfaces of the illustrated panes are joined by the spacer. Thus, the spacer and the confronting inner surfaces 14, 14' of the panes 10, 10' together define the between-pane space 115.

Typically, the spacer is formed of a metal (e.g., aluminum) or metal alloy tubing. This tubing can be provided in a variety of cross-sectional configurations. For example, FIGS. 1–3 illustrate three different useful spacer designs. Particularly useful spacers are disclosed in U.S. Pat. Nos. 5,377,473, 5,439,716, 5,679,419, 5,705,010, and 5,714,214, the entire teachings of each of which are incorporated herein by reference. A variety of conventional spacer designs are commercially available from Alumet Manufacturing, Inc., which is located in Marysville, Wash., U.S.A.

The spacer characteristically includes two generally opposed lateral surfaces that are adapted to be bonded respectively to the peripheral inner surfaces of the panes. Bonding the spacer to both panes desirably forms a gas-tight seal that prevents air and other gas from entering and escaping the between-pane space. As shown in FIG. 1, the interior of the spacer desirably carries a deposit of desiccant 111. The desiccant 111 is preferably provided in particulate form (e.g., in a granular or powdered form), to facilitate flowing the desiccant into the interior of the spacer. While a variety of conventional desiccants can be used, it is believed to be preferable to employ a low-deflection desiccant (i.e., one that minimizes the adsorption of the gases in air, particularly nitrogen). For example, desiccants containing only 3A molecular sieve, or blends of 3A sieve and silica gel, will be suitable in most cases. Such desiccants are conventional and are available through a number of well known commercial suppliers.

The sealing system of an IG unit 8 desirably minimizes gas flow between the gas space inside the unit and the ambient environment outside the unit. While some IG units have only a single seal, high performance units typically include two seals: a primary or "first" seal and a secondary or "second" seal. This is best seen in FIGS. 2 and 3, wherein the first seal (i.e., the seal closest to the between-pane space) is designated by the reference numeral 103 and the second seal (i.e., the seal farthest from the between-pane space) is designated by the reference numeral 105. The first seal 103 is preferably formed of material that has good resistance to the permeation of air, moisture, and any insulative gas fill. For example, this seal 103 can be formed advantageously of a butyl sealant (e.g., polyisobutylene). The second seal 105 is preferably formed of material that has good adhesive properties. For example, this seal 105 can be formed of silicone, polysulfide, polyurethane, or any other material that bonds adhesively with the spacer and the panes. Thus, the spacer 101, together with the first 103 and second 105 seals, isolates the gaseous atmosphere within the between-pane space 115 from the ambient atmosphere of the exterior space 132.

The between-pane space 115 of an IG unit 8 can be advantageously filled with insulative gas. It is to be understood that the term "insulative gas" is used herein to refer to any gas or gas mix that is a better thermal insulator than air. For example, a gas is to be considered insulative if it has a lower thermal conductivity than air, and hence reduces heat transfer by conduction. A gas is also to be considered insulative if it is heavier than air, and hence reduces heat transfer by convection. Argon is a preferred insulative gas. Krypton gives even better performance, but is more expensive than argon. Other inert gas fills can be used as well. Argon, krypton, and other inert gases are commercially available from a number of suppliers, including Air Liquide America Corporation (Cambridge, Md., U.S.A.).

It is believed to be preferable to provide the between-pane space of an IG unit with a gaseous mixture of air and at least one insulative gas. The concentrations of air and insulative gas can be varied to suit different applications. However, concentrations by volume of 80–98% argon and 2–20% air (e.g., 90% argon/10% air) are believed to be suitable. Concentrations by volume of 97% argon and 3% air have given good results.

While high performance IG units are commonly provided with insulative gas fills, many standard IG units simply contain air. Either way, the between-pane space 115 is conventionally filled to a pressure that is equal, or as close as possible, to the ambient atmospheric pressure. As noted above, it is believed that insulative gas can leak out of the between-pane space of an IG unit at a greater rate than the gases in air infiltrate this space, causing the interior pressure to fall below the ambient exterior pressure. In other cases, an IG unit may initially be pressurized to local atmospheric pressure, and then transported to a higher elevation having lower atmospheric pressure. At this point, the interior pressure of the IG unit will be greater than the atmospheric pressure. In one embodiment of the invention, a hole is then formed in one of the panes of the IG unit, and some of the gas within the unit is allowed to flow out of the unit through the hole until the pressure inside the unit matches that outside the unit, at which point the hole is sealed, as described below. In some cases, an IG unit may be inadvertently underfilled or overfilled, creating a pressure differential across the panes of the unit. In each of these cases, it may be desirable to eliminate, or at least reduce, the pressure differential between the interior and exterior of the IG unit.

Thus, the invention provides methods of servicing an IG unit to reduce a pressure differential across the panes of the unit. In these methods, a hole 70 is formed through one of the panes 10, 10' of the IG unit 8 (e.g., the hole 70 may be formed after the IG unit has been fully assembled, rather than before or during assembly of the unit). Prior to forming the hole, the gaseous atmosphere within the between-pane space 115 of the unit 8 is at a pressure different than that of the ambient exterior atmosphere. As noted above, the interior pressure may be lower or higher than atmospheric pressure. Thus, it may be desirable to flow gas into the IG unit, or out of the IG unit, to reduce the pressure differential.

It will likely be more common for IG units to develop sub-atmospheric interior pressure than to develop super-atmospheric interior pressure. Thus, in certain particularly advantageous embodiments, the gaseous atmosphere within the between-pane space of an IG unit is at a sub-atmospheric pressure prior to hole formation. By then forming a hole 70 in one of the panes of the IG unit (as described below), gas can be allowed (or forced) to flow into the IG unit through the hole 70. Once the desired interior pressure is reached, the hole 70 can be permanently sealed (e.g., in the manner described below). Embodiments of this nature are expected to have particular utility.

In some cases, it will be apparent that an IG unit has developed a pressure differential. For example, the panes of an IG unit may become visibly bowed or cupped. In fact, when an IG unit becomes severely under-pressured, the panes may actually touch near the center of the unit, sometimes causing a visible halo effect. In other cases, it may be necessary to measure the width of an IG unit, and the width of its between-pane space (i.e., the "airspace thickness", "gap thickness", "air gap", "air space", or "gap"), to determine whether a pressure differential exists.

A variety of measuring devices can be used to measure the width (or "thickness") of an IG unit. For example, a conventional laser gap gauge can be used quite advantageously. These gap gauges create laser reflections off the surfaces of the panes, which reflections appear on a graduated scale of the gauge. These reflections indicate the thickness of the panes, as well as the thickness of the air space separating the panes. Preferably, measurement is taken with a gauge of this nature from a single side, and at the center, of the IG unit. Thickness gauges of this nature are sold by a number of commercial suppliers, including EDTM Inc., which is located in Toledo, Ohio, U.S.A. One suitable gap gauge is sold by EDTM under the trade name MIG-MG1500.

It may be preferable to perform pressure equalization anytime the pressure differential on an IG unit reaches or exceeds a certain level. For example, skilled artisans may wish to select a certain minimum pressure differential, and then repair any IG unit that develops a pressure differential above such minimum. For example, pressure equalization may be performed any time the air gap of an IG unit exceeds a certain maximum deviation (or a certain maximum positive deviation and a different maximum negative deviation) from the design gap (i.e., the thickness of the between-pane space when no pressure differential exists). The design gap (which will commonly range from about 11.5 mm to about 19.5 mm) can sometimes be determined by inspecting markings (e.g., stamped or printed numbers) on the inner wall of the spacer. If no design gap markings can be found, then a gap gauge can be used to estimate the design gap by measuring the air gap near the side of the IG unit. In certain embodiments, an IG unit is repaired if it has developed a pressure differential that causes the panes to deflect on the order of about 1.0 mm to 2.0 mm or more from its design gap. The desired repair criteria can be varied for different IG units (e.g., for units of different size, air gap thickness, etc.) and different atmospheric conditions (e.g., temperature, altitude, and barometric pressure). Once it is determined that an IG unit has a pressure differential, or that such pressure differential exceeds a certain magnitude, a pressure equalization method of the invention can be performed.

The hole 70 can be formed by any desired hole forming method. As presently contemplated, it is believed to be preferable to form the hole 70 by drilling. However, the hole can be formed by any method appropriate for forming holes through the material from which the panes are formed (e.g., glass). For example, the hole could alternatively be formed using an ablative cutting tool. Tools of this nature create holes by emitting a high speed fluid flow in which abrasive particles are carried. This flow typically comprises a stream of carrier gas in which a plurality of sharp particles of rigid material are carried. Ablative tools are commonly used, for example, to remove dental material. It is also anticipated that the hole could be formed using a laser. Skilled artisans will appreciate that a variety of other hole forming methods and devices can be used. In certain embodiments, the hole 70 is formed in a major surface of the pane 10. The diameter of the hole 70 is less than 0.060 inch in certain preferred embodiments.

As noted above, the hole 70 can be formed by drilling. For example, FIG. 4 depicts a drill bit 60 that can be used to form a hole 70 (or "aperture") through one of the panes 10, 10' of an IG unit 8. The drill bit 60 has a shaft 61 with a length terminating in a distal end 62 (or "tip"). The drill bit 60 also has an optional collar 64 (or "stop") disposed on its shaft. A set screw 66 can be provided for restraining travel of the stop 64 along the length of the shaft 61. This stop 64 can serve to limit penetration of the bit 60 into the between-pane space 115 of the IG unit 8. For example, it can prevent the bit 60 from being advanced so far as to bring its tip 62 into contact with the inner surface 14' of the pane 10' opposite that 10 in which the hole 70 is drilled.

Figure 5:
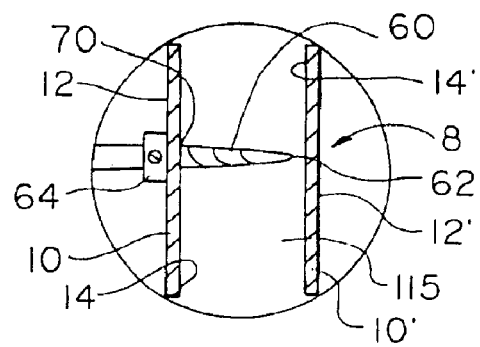
FIG. 5 is a detailed, cross-sectional side view of an insulating glass unit depicted after the drill bit of FIG. 4 has formed a hole through one of the panes of the insulating glass unit in accordance with certain embodiments of the invention.

FIG. 5 illustrates the drill bit 60 after forming a hole 70 through the first pane 10 of an IG unit 8. In forming the hole 70, a drill (not shown) carrying the bit 60 is operated (i.e., energized) while the tip 62 of the bit 60 is engaged with the outer surface 12 (i.e., the surface oriented away from the between-pane space) of the first pane 10. By forcing the tip 62 of the rotating bit 60 against the outer surface 12 of the pane 10, the bit 60 begins to bore through the pane 10 in the direction of the between-pane space 115. In one method, the hole 70 is completed by advancing the bit 60 through the first pane 10 until the tip 62 of the bit 60 emerges from the inner surface 14 of the pane 10. The drill bit 60 can then be removed, leaving a hole 70 though the pane 10. In this method, any of a variety of conventional drill bits can be used. For example, a drill bit (e.g., a carbide bit) having a diameter of less than about 1/16 inch is particularly preferred. The length of the bit (or bits) should be appropriate for the thickness of the pane 10.

The drill is preferably operated at a relatively slow rotational speed during hole formation. For example, drill speeds of between about 5,000 rpm and about 10,000 rpm have given good results when drilling through glass. A Dremel cordless drill (e.g., model #750), preferably with an extra battery pack and/or charger, can be used to form the hole 70. As the drill bit is advanced through the pane, spalling dust will typically build up around the hole being formed. This dust is preferably removed from the hole and the surrounding area, for example, by blowing dust away from the hole periodically during drilling. Finally, it is preferable to work the bit in an out of the hole during drilling (e.g., using a pecking technique). This is advantageous as it helps remove debris that builds up in the hole during drilling. It may also keep the drill bit from becoming too hot as a result of the friction that occurs during drilling.

In one embodiment, the invention provides a particularly advantageous method for forming a hole 70 in a pane 10 of an IG unit. In this method, a fine point bit is used to form the initial and final lengths of the hole 70. For example, a fine point drill bit (e.g., a carbide bit having a diameter of about 1/32 inch) can be used to drill a pilot hole (e.g., at about 5,000 rpm). It is then advantageous to switch to a ball point bit (e.g., a carbide bit having a diameter of about 1/32 inch) to drill a middle length of the hole 70 (e.g., at between about 5,000 rpm and about 10,000 rpm). Preferably, this middle length accounts for a major portion of the hole 70 (e.g., this middle length preferably forms a greater extent of the hole than does either of the initial or final lengths). The ball point bit will typically drill faster, and will tend to be more durable (perhaps having a longer useful life), than the fine point bit. Just prior to breaking through the inner surface 14 of the pane 10, the ball point bit is preferably replaced with the fine point bit, and the final length of the hole 70 is desirably drilled with this fine point bit. This procedure has been found to minimize damage (e.g., spalling) to the inner surface 14 of the pane 10. Good results have been achieved using fine point and ball point drill bits with diameters of 1/32 inch to form a hole with a diameter of about 0.040 inch.

When a drilling technique is used to form the hole 70, the entire hole 70 can be formed by drilling from a single side of the pane 10 (e.g., using the method described in the immediately preceding paragraph), if so desired. Certain embodiments involve drilling the hole 70 in one of the panes of an IG unit that has already been assembled, rather than drilling the hole 70 before or during fabrication of the IG unit. As is perhaps best understood with reference to FIG. 9B, the hole 70 can take the form of a cylindrical aperture. For example, the interior wall (e.g., all areas of the interior wall) of the hole 70 may be generally perpendicular to the interior 14 and exterior 12 surfaces of the pane 10. This allows the hole 70 to be formed by drilling from one side 12 of the pane 10 all the way through to the other side 14 of the pane 10. In such embodiments, the interior wall of the hole 70 is not required to have any particular complex configuration (e.g., it is not required to have a venturi shape or the like).

When the drill bit 60 breaks through the inner surface 14 of the pane 10, some spalled material (e.g., glass dust) may be left on the inner surfaces 14, 14' of the panes 10, 10' adjacent the hole 70. For example, a noticeable deposit of dust may build up on the inner surface 14' of the pane 10' opposite that 10 in which the hole 70 has been formed. Preferably, this dust is distributed such that no concentrated dust deposits are left adjacent the hole 70. This can be done manually (e.g., by blowing into the hole 70). Alternatively, a hand pump or the like can be used to blow this dust away. If so desired, a can of compressed air (e.g., an air duster with straw) can be used to deliver a burst of gas into the hole 70. If an air duster is used and has not been sprayed for some time, then some of the air in the duster should be discharged prior to use on the hole 70. If used, the air duster is preferably sprayed with the can in an upright position. It is noted that safety glasses and protective clothing are preferably worn during drilling.

Drilling is preferably ceased shortly after the drill bit 60 penetrates the between-pane space 115. This assures that the drill bit 60 will not begin to bore into the second pane 10'. As noted above, a drill bit stop 64 can be used to limit travel of the drill bit 60 in this manner. It may be desirable to reduce the rotational speed of the drill bit 60 just as the tip 62 of the bit 60 is about to emerge from the inner surface 14 of the pane 10. This may reduce spalling of the pane 10 as the bit 60 breaks through the inner surface 14 of the pane 10. It may also be desirable to reduce the force with which the bit 60 is pressed against the pane 10 at this stage of the drilling operation.

The drill bit 60 can be driven by any drill bit driving device, including electric, pneumatic, or hydraulic motors. Any drill adapted for use with a bit of the desired size can be used. For example, dremel-type drills will typically be suitable. Cordless battery-operated drills of this nature are particularly convenient. Such drills are available from the Dremel Company, which is located in Racine, Wis., U.S.A. As noted above, the bit 60 may advantageously include a surface coating of carbide, diamond, or another mechanically hard material. Surface coatings of this nature are well known and are believed to be advantageous when the pane 10 is formed of glass.

Drill bits of various size can be used to form the hole 70. Generally speaking, it is preferable to form a small hole (whether or not by drilling), such that the hole will not be unduly noticeable after it has been filled. For example, it will typically be preferable to form a hole having a diameter of less than about ¼ inch, more preferably less than about ⅛ inch, and perhaps optimally less than about 1/16 inch. However, the present methods are not limited to any particular hole size. For example, a larger hole may be advantageous in cases where it is desirable to quickly reduce a pressure differential on an IG unit.

Figure 13A:
FIG. 13A is a photograph of an unfilled hole that has been formed in one pane of an insulating glass unit in accordance with certain embodiments of the invention.
Figure 13B:
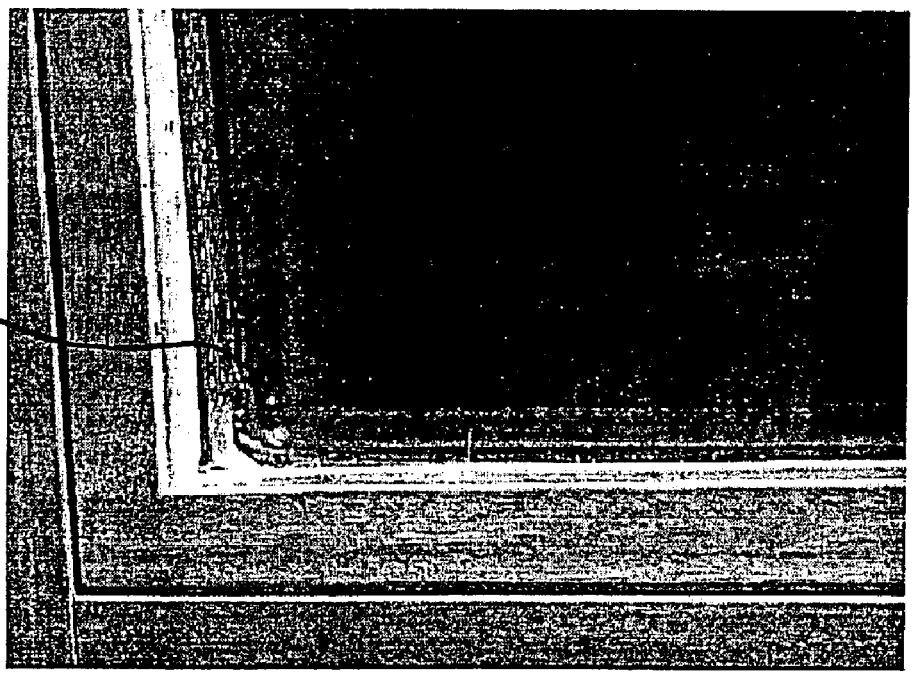
FIG. 13B is a photograph of the hole of FIG. 13A after it has been sealed in accordance with certain embodiments of the invention.

In certain favored methods of the invention, the hole size (e.g., diameter) is less than 0.0625 inch, or preferably less than about 0.042 inch, and perhaps less than about 0.03125 inch. As can be appreciated with reference to FIGS. 13A and 13B, holes of this nature are surprisingly unnoticeable. In fact, these holes are nearly invisible (see FIG. 13B) when filled with an optically clear sealant, as described below. When the hole 70 is formed by drilling, the bit may advantageously have a diameter in one of the three ranges described above in this paragraph. If so desired, the hole 70 can be formed so as to have a diameter of about 0.040 inch or less (e.g., about 0.010 inch). In one embodiment, the hole diameter is between about 0.040 inch and about 0.010 inch. The hole 70 can be formed, for example, using dremel-type drill bits, or drill bits used conventionally to form holes in printed circuit boards. Drill bits of this nature are available from a number of commercial suppliers, including the Dremel Company.

As noted above, the hole 70 is surprisingly unnoticeable even before being sealed. In this regard, reference is again made to the photograph of FIG. 13A, which depicts an unfilled hole 70 having a diameter of about 0.040 inch. When the hole 70 is formed in a transparent pane (e.g., glass) and is sealed with an optically clear sealant, the sealed hole 70' is nearly invisible (particularly when the hole 70 has a diameter of less than 0.0625 inch). This can be appreciated by referring to FIG. 13B, which depicts the hole 70 of FIG. 13A after it has been filled with an optically clear sealant. As evidenced by the photograph of FIG. 13B, the resulting sealed hole 70' is surprisingly invisible. Thus, the repaired IG unit bears almost no trace of repair. As a consequence, the present methods are particularly desirable.

In one embodiment of the invention, there is provided an IG unit comprising two spaced-apart panes at least one of which has therein formed a hole 70 with a diameter of less than 0.0625 inch. In this embodiment, gas is flowed through the hole 70 (e.g., in accordance with any one of the techniques described herein) and the hole 70 is then sealed with an optically clear sealant. As noted above with reference to FIGS. 13A and 13B, a small sealed hole 70' of this nature is surprisingly invisible, especially when the panes of the IG unit are formed of glass or another transparent material.

Small hole size may facilitate injecting or otherwise delivering a flowable sealant into the hole 70 without having the sealant flow beyond the inner side of the hole and down the inner surface 14 of the pane 10. Small hole size may also facilitate filling an IG unit with insulative gas. For example, an IG unit 8 can be filled with insulative gas by first drawing a vacuum in the between-pane space 115, and thereafter flowing insulative gas through the hole 70 and into the between-pane space 115, as discussed below. If the hole 70 is allowed to communicate with the ambient exterior atmosphere after vacuumizing, but prior to filling the between-pane space 115 with insulative gas, then the natural flow of air through the hole 70 and into the between-pane space 115 will likely proceed at a fairly slow rate. This can facilitate achieving a mixture of air and insulative gas by allowing the hole 70 to breathe for a predetermined period of time before filling the between-pane space 115 with insulative gas.

Figure 9:
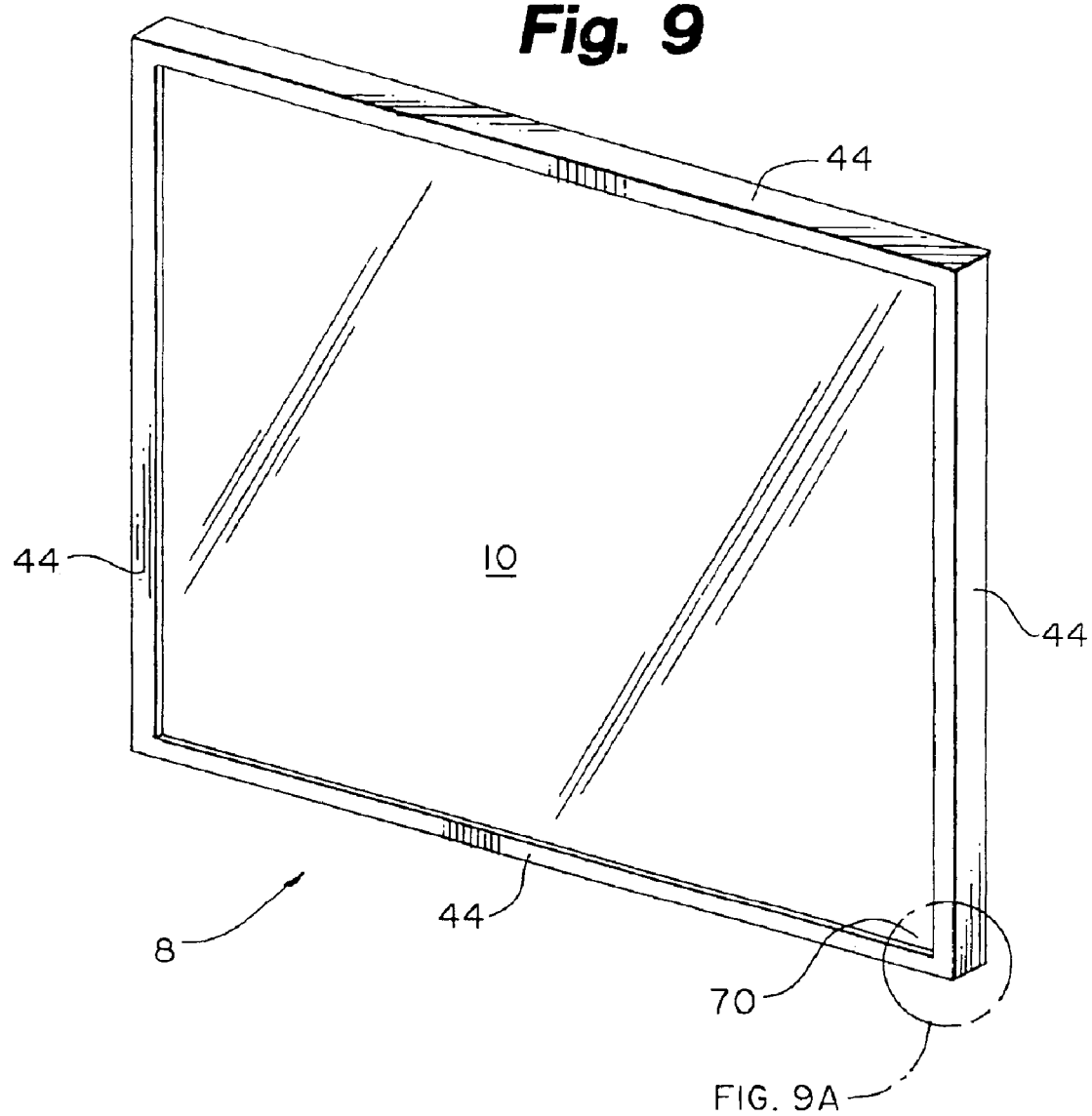
FIG. 9 is a perspective view of an insulating glass unit assembly wherein a hole has been formed in one of panes of the insulating glass unit in accordance with certain embodiments of the invention.
Figure 9A:
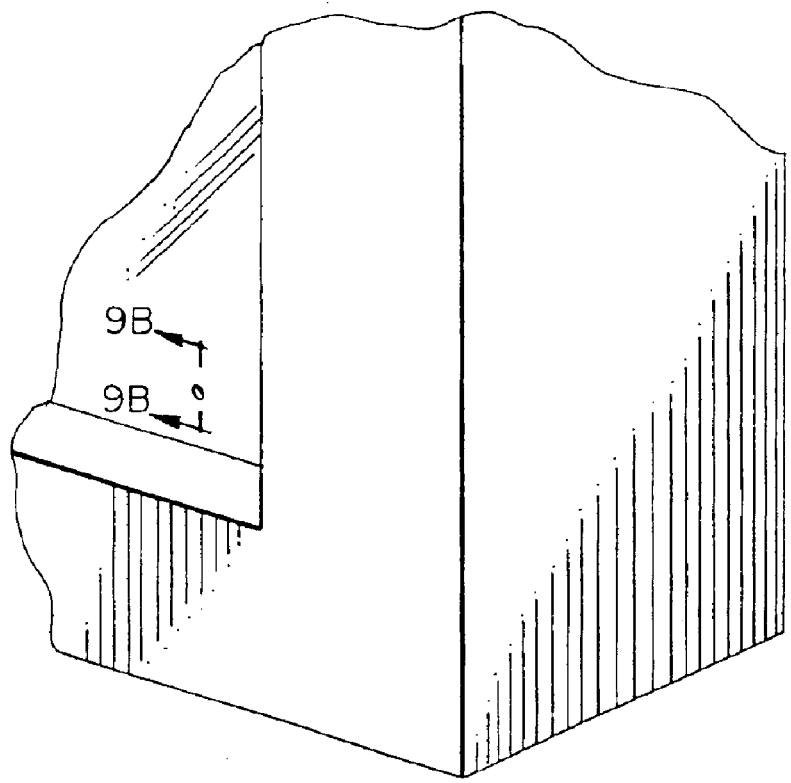
FIG. 9A is a detailed, perspective view of region 9A of the insulating glass unit of FIG. 9.
Figure 9B:
FIG. 9B is a detailed, cross-sectional view, taken along line 9B, of the insulating glass unit of FIG. 9A.

In many cases, it will be preferable to form the hole 70 near a corner of the pane 10. In one embodiment, the hole 70 is formed between about ½ inch and about ¾ inch from one of the corners of the pane 10. FIG. 9 illustrates an IG unit 8 wherein a hole 70 has been formed near a corner of one 10 of the panes of the unit 8. This tends to minimize the visible impact of the hole 70 once it has been filled. However, this is by no means a requirement. For example, the invention provides hole-filling methods that achieve filled holes that are surprisingly invisible. Thus, it is by no means a requirement that the hole 70 be formed in any particular inconspicuous location on the pane 10.

Figure 10:
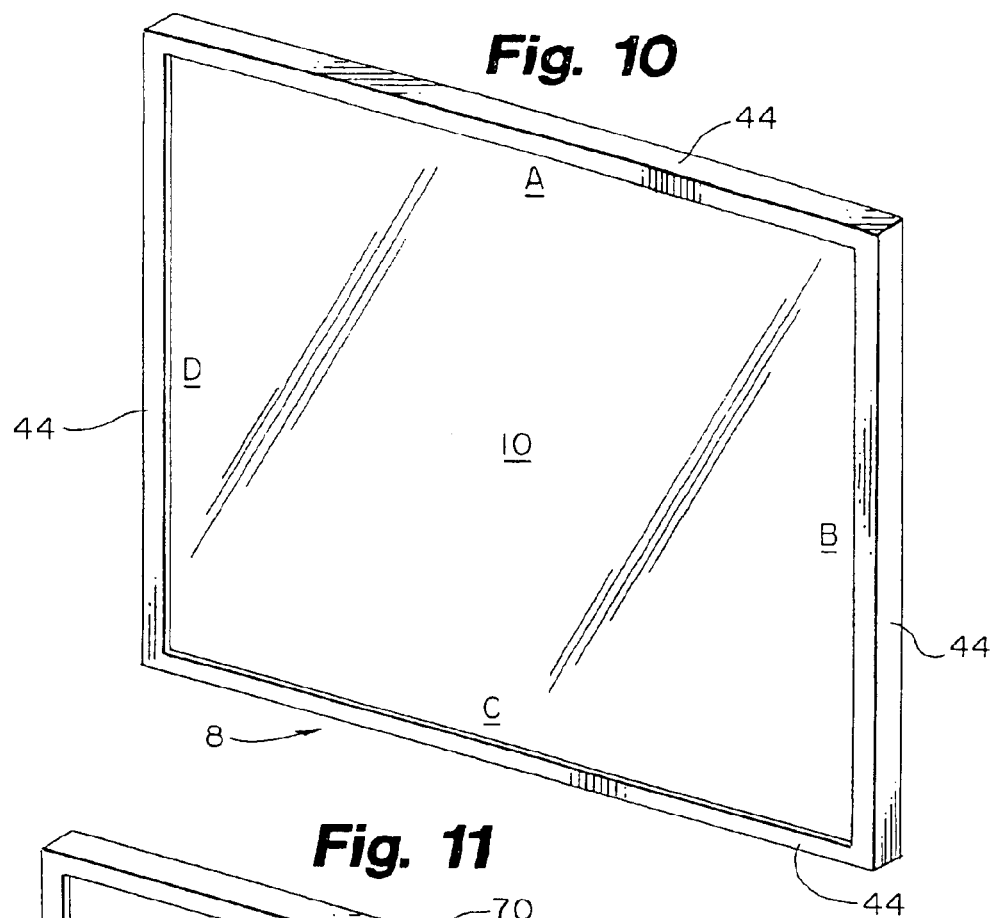
FIG. 10 is a perspective view of an insulating glass unit assembly wherein four potential regions for hole formation are depicted in accordance with certain embodiments of the invention.
Figure 11:
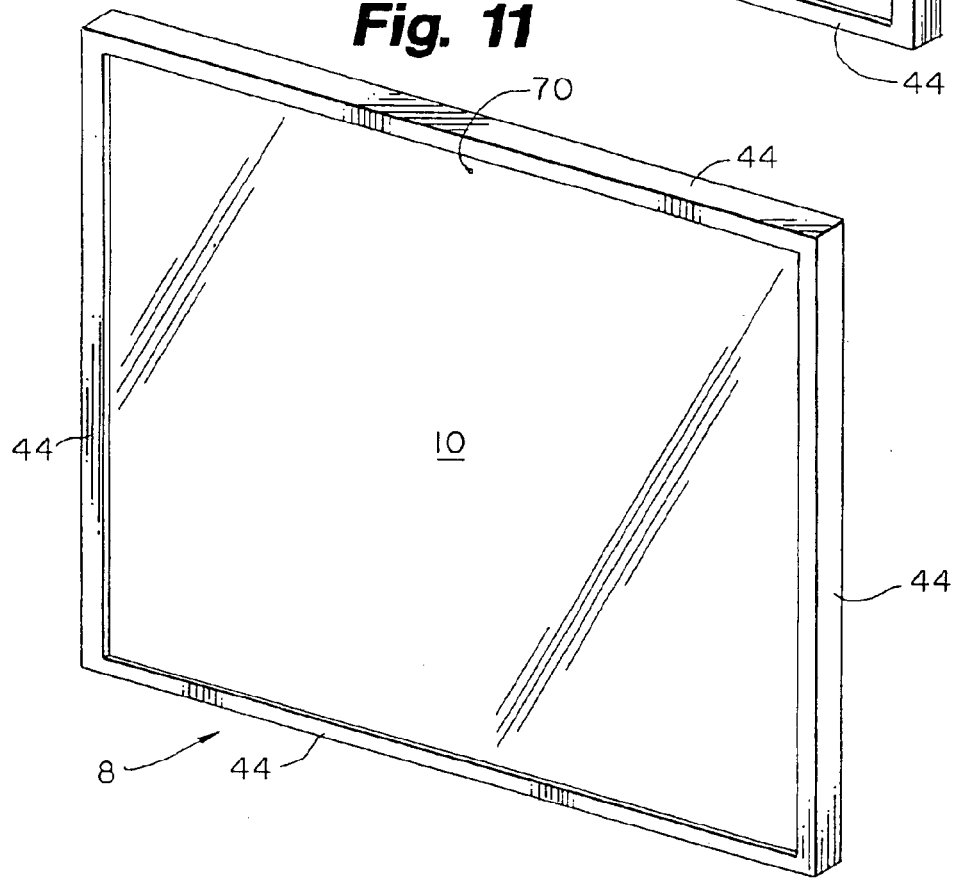
FIG. 11 is a perspective view of an insulating glass unit assembly wherein a hole has been formed in one of the panes of the insulating glass unit in accordance with certain embodiments of the invention.

In some cases, it may be preferable to form the hole near a midpoint of one side of the IG unit 8. For example, the internal stress on the panes of an IG unit 8 is believed to be relatively low near the midpoint of each of the four sides 44 (or "legs") of the IG unit 8. Thus, it may be preferable to form the hole in one of these four regions. This is perhaps best appreciated with reference to FIG. 10, wherein the reference letters A, B, C, and D represent four leg midpoint regions where a hole can be advantageously formed. FIG. 11 illustrates an IG unit 8 wherein the hole 70 is formed near the midpoint of the top leg 44. This may be a particularly inconspicuous location for the hole 70, as the top of a window will commonly be covered on the roomside (i.e., on the inboard side) by curtains or the like. In most cases, though, it is not believed to be necessary to form the hole 70 in any particular low-stress region of the pane 10, as formation of the hole 70 is not expected to cause significant stress related problems (with the exception of tempered or heat-strengthened glass).

It is currently believed that the present hole formation methods should not be performed upon glass that has been tempered or heat strengthened. For example, drilling a hole through a pane of tempered glass creates a highly failure prone state of stress within the glass. In fact, relatively light physical contact with a pane of tempered glass in which a hole has been drilled has been found to shatter the glass. Thus, it is believed to be preferable not to practice the present hole forming methods in conjunction with tempered or heat-strengthened glass. Tempered glass normally bears a tempered logo, and the operator should check to make sure that a glass pane to be drilled does not bear such a logo. It may not be easy to determine whether an IG unit comprises heat-strengthened glass (e.g., heat-strengthened glass typically does not bear a logo indicating it as such). To the extent repair is performed on such an IG unit, it may be preferable to drill into the outboard pane of the unit, as the inboard pane may be more likely to be heat-strengthened glass. It is noted, however, that the development of tempered or heat-strengthened glass in which holes can be safely formed (or safe methods for forming holes in such glass) would allow the present methods to be practiced safely with these types of glass. The present methods are preferably carried out by an operator equipped with safety glasses and protective clothing.

Figure 12:
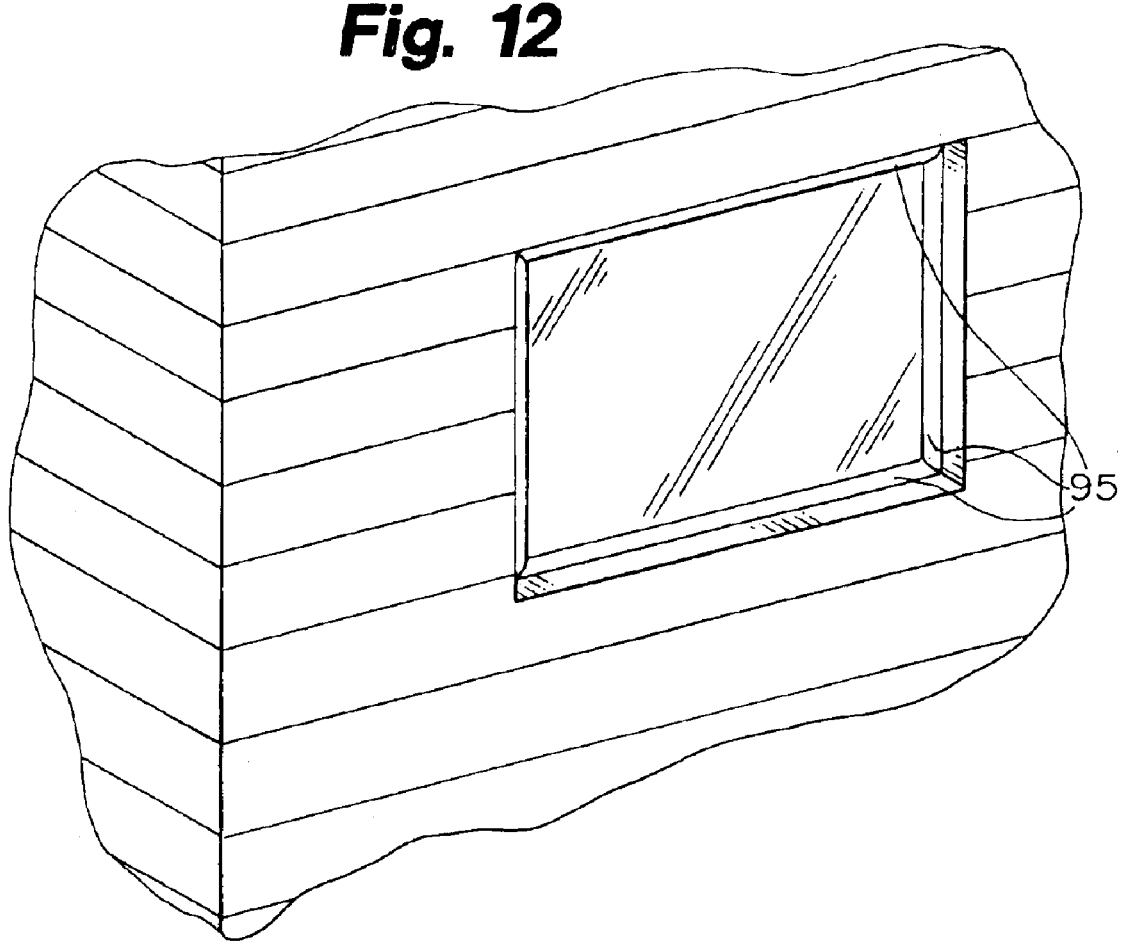
FIG. 12 is a perspective view of an insulating glass unit installed in the wall of a building.

In certain methods of the invention, a hole 70 is formed through one of the panes of an IG unit that has already been incorporated into a sash and/or frame (and/or mounted in the wall of a building). For example, FIGS. 2 and 12 illustrate IG units 8 mounted upon frames 90. If a pressure differential were to develop across the panes 10, 10' of such an IG unit 8, then the present method could be used to reduce the pressure differential without removing the unit 8 from the frame 90. This would involve forming a small hole 70 in one of the panes 10, 10' of the mounted unit 8, flowing gas through the hole 70, and thereafter sealing the hole 70, as described below.

Hole formation can be performed from either side of an IG unit that has been installed in an exterior wall of a building. In some cases, it will be preferable to have the hole 70 formed from an outdoor side (i.e., the "outboard side") of the mounted IG unit. In these cases, a service person can approach the outdoor side of the mounted IG unit and, without entering the building, can form a hole 70 through the outboard pane (i.e., the pane exposed to the outdoor environment). The hole 70 can thus be formed without interrupting the occupants (e.g., a homeowner) of the building by having to enter the building. In other cases, it will be preferable to form the hole 70 from the indoor side (i.e., the "inboard side" or "roomside") of an installed IG unit. For example, this will assure that the sealed hole 70 is not exposed to an outdoor environment. This may be particularly desirable in geographic locales that experience severe weather (e.g., cold winters, hot summers, and/or excessive precipitation or humidity). For example, the integrity of the sealed hole 70' may be maintained for a particularly long time if the sealed hole 70' is oriented toward an indoor environment. It can thus be appreciated that the present methods offer flexibility in that they allow an installed IG unit to be serviced selectively from either the indoor side or the outdoor side of the unit.

In certain embodiments, once the hole 70 has been formed, gas is flowed through the hole 70. This can simply be done by allowing the hole 70 to communicate (i.e.; vent) with the ambient exterior atmosphere. If the interior pressure is initially (i.e., prior to hole formation) less than atmospheric pressure, then air will naturally flow through the hole 70 and into the between-pane space 115. On the other hand, if the interior pressure is initially greater than atmospheric pressure, then gas within the between-pane space 115 will naturally flow through the hole 70 and out of the between-pane space 115. Either way, the initial pressure differential will be reduced This pressure equilibrium process can be allowed to progress until the pressure differential between the interior of the IG unit and the ambient exterior atmosphere is reduced to a desired level. In most cases, the equilibrium process will be allowed to run its full course (i.e., the unit will be allowed to "equalize"), such that the pressure differential is eliminated (i.e., until the pressure within the IG unit is equal to that of the ambient exterior atmosphere).

Following such venting, the air gap 115 can be measured (e.g., in the manner described above) to determine if the gap 115 has returned to, or close enough to, its original dimension (i.e., to its design gap). In one preferred embodiment, the IG unit is allowed to vent until the panes return to within 1 mm or less of the design gap. In this method, if the panes do not return to within 1 mm of the original gap, then a hand pump or the like is used to bring the panes to within this tolerance.

In many cases, equilibrium can be reached by venting for a matter of a few minutes. In some case, though, unassisted gas flow during the equilibrium process may be slower than desired. This tends to be particularly true in cases where the hole 70 is small. Thus, to increase the speed of the equilibrium process (i.e., to increase the rate of gas flow through the hole), or to assure that the panes reach their intended separation, it may be desirable to employ one or more gas flow accelerators (e.g., a vacuum pump, a gas compressor, or both in turn). Thus, to rapidly increase the pressure within an IG unit, a gas pump, gas compressor, pressurized gas source, or the like can be used to force gas through the hole 70 and into the between-pane space of the IG unit. On the other hand, to rapidly decrease the pressure within an IG unit, a vacuum pump or the like can be used to pull gas through the hole 70 and out of the between-pane space. As another alternative, a vacuum pump or the like can be used to rapidly draw a vacuum within the between-pane space, whereafter a gas compressor or the like can be used to rapidly refill the between-pane space (e.g., with insulative gas).

Figure 6:
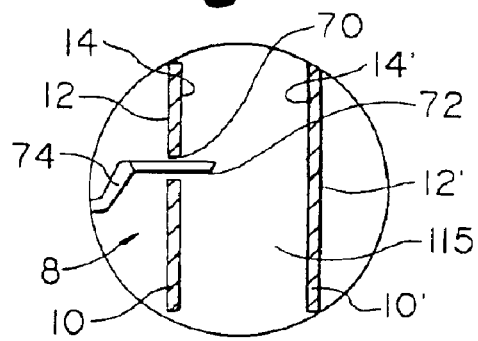
FIG. 6 is a detailed, cross-sectional side view of the insulating glass unit of FIG. 5 depicted with a gas flow tube disposed through the hole in accordance with certain embodiments of the invention.

FIG. 6 illustrates a gas flow tube 74 that is in communication with a hole 70 in a pane 10 of an IG unit 8. The illustrated gas flow tube 74 is coupled at one end to an optional injection needle 72 that is engaged with (i.e., disposed within) the hole 70. The other end of the gas flow tube can be coupled to a vacuum pump, a gas compressor, or the like. Thus, the gas flow tube 74 can be used to force gas into, or out of, the between-pane space 115 of the IG unit 8.

In cases where it is desired to flow gas into the IG unit (e.g., where under-pressure is a problem), the gas flow tube 74 is advantageously coupled to a gas pump, gas compressor, pressurized gas source, or the like. Thus, gas can be urged into the IG unit 8 by delivering gas through the gas flow tube 74 and into the between-pane space 115. By forcing gas into an IG unit in this manner, the pressure within the between-pane space can be rapidly increased, a negative pressure differential can be rapidly reduced, and/or the gaseous composition within the between-pane space can be rapidly changed. For example, a conventional hand pump (optionally with a pressure gauge) can be used by manually pumping the handle of the pump until the pressure within the IG unit reaches a desired level, and/or until the IG unit reaches a desired dimension (e.g., a desired airspace thickness) or configuration (e.g., wherein the panes 10, 10' are parallel).

The gas pumped into the IG unit may simply be air, which can be desiccated to minimize condensation within the IG unit, if so desired. Alternatively, this gas may be a mixture of air and argon, and/or krypton, and/or another inert gas, as described above. As gas is forced into the between-pane space, gas from within this space may also escape outwardly from the hole 70 (e.g., when a gas injection needle 72 like that shown in FIG. 6 is used). If so desired, the concentrations of gases within the between-pane space 115 can be measured by evaluating the concentration of gas escaping from the hole 70. Thus, pumping can be continued until a desired gas concentration is detected in the gas escaping from the hole 70.

In cases where it is desired to pull gas out of the IG unit (e.g., where over-pressure is a problem), the gas flow tube 74 is advantageously coupled to a vacuum pump or the like. Thus, gas can be removed from the IG unit 8 by pulling gas through the gas flow tube 84 and out of the between-pane space 115. By removing gas from an IG unit in this manner, the pressure within the between-pane space can be rapidly decreased, a positive pressure differential can be rapidly reduced, and/or the gaseous concentration within the between-pane space can be rapidly changed.

It is to be understood that the term "vacuum" is used herein to refer to a partial vacuum. For example, methods of the invention that involve drawing a vacuum in (or "evacuating") the between-pane space of an IG unit do not require the establishment of a full vacuum. Rather, the between-pane space may be reduced to an ambient gauge pressure of minus several psi, e.g., minus about two psi (that is, to an actual pressure within the enclosure of about 12.7 psi for an ambient pressure of about 14.7 psi). Of course, the vacuum drawn in a given case may be substantially greater or less than this, as desired. The phrase "ambient gauge pressure" is used herein to denote a pressure measurement wherein ambient atmospheric pressure is defined as zero. If a vacuum of minus several psi(g) or less is desired, the vacuum pump may simply be an air blower. If a greater vacuum is desired, then the vacuum pump may utilize a separate vacuum tank of substantial volume in which a vacuum is drawn and which is placed in communication with the hole 70, and thus opened to the between-pane space of an IG unit to rapidly lower the pressure within the unit.

Records can be advantageously maintained each time the present methods are performed. For example, it may be desirable to keep records as a check that a given method has been performed correctly and/or to create data for future research. In some cases, any one or more of the following data types are recorded and maintained each time the present methods are performed: the direction the involved IG unit faces (e.g., north, south, west, east); the room (or room type) the IG unit is in; the date on which the IG unit was manufactured; the design gap of the IG unit; the center gap before performing the method; the center gap after performing the method; and whether the IG unit was replaced entirely. Skilled artisans will be able to readily create, record, maintain, analyze, and do further research with, data of this nature.

Figure 7:
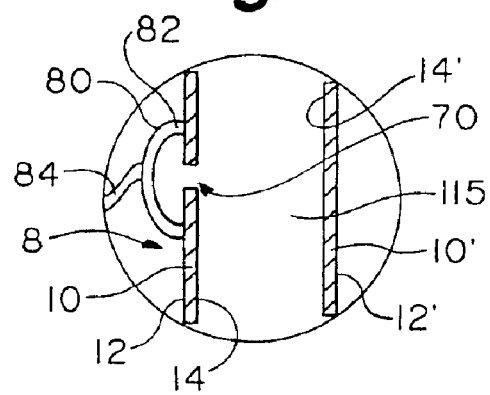
FIG. 7 is a detailed, cross-sectional side view of the insulating glass unit of FIG. 5 depicted with a gas flow assist cup disposed about the hole in accordance with certain embodiments of the invention.

FIG. 7 illustrates a gas flow tube 84 that is coupled at one end to a flow assist cup 80 engaged with the hole 70. The other end of the gas flow tube can be coupled to a gas compressor or a vacuum pump, as desired. Thus, the flow assist cup 80 can be used to flow gas into, or out of, the between-pane space 115. When delivering gas into the IG unit 8, the rim 82 of the cup 80 is preferably secured against the outer surface 12 of the pane 10 to assure that delivered gas flows into the hole 70. If so desired, this can be accomplished by providing suction lumens (not shown) coupled to the rim 84 of the cup 80. When pulling gas out of the IG unit, the rim 82 of the cup 80 should initially be positioned against the surface 12 of the pane 10, whereafter the suction of the vacuum pump may keep the cup 80 sealed against the surface 12 of the pane 10.

As noted above, the present methods can be used to accomplish different goals. For example, these methods can be employed to reduce a pressure differential on an IG unit (e.g., to change from a first gaseous interior pressure to a second gaseous interior pressure). These methods can also be used simply to change the pressure within an IG unit. For example, it may be desirable to flow gas into an under-filled IG unit to increase the pressure inside the unit to a desired over-filled (i.e., super-atmospheric) level, even though the magnitude of the pressure differential is not actually reduced. Further, these methods can be employed to change the composition of the gaseous atmosphere within the between-pane space of an IG unit. For example, an IG unit that is initially filled only with air can be filled with insulative gas (or a mixture of air and insulative gas). Similarly, an IG unit that initially contains a first insulative gas (e.g., argon) can be upgraded to a second insulative gas (e.g., krypton) having better insulative capacity than the first insulative gas. Alternatively, the concentration of the first insulative gas can simply be increased to a desired level. Thus, the present invention offers a wide range of utility.

It can be particularly advantageous to employ one or more gas flow accelerators (e.g., a vacuum pump and/or gas compressor) in successive steps when it is desired to change the gaseous composition within an IG unit. For example, a gas injection needle or flow assist cup can be used in a first step to evacuate (e.g., to draw a vacuum in) the between-pane space of an IG unit. If an injection needle (such as that shown in FIG. 6) is used to draw the vacuum, then the space between the interior wall of the hole 70 and the exterior wall of the needle 72 is preferably sealed to facilitate good suction. This step can alternatively be performed using a flow assist cup (such as that shown in FIG. 7). After the desired vacuum has been drawn within the between-pane space, an injection needle or flow assist cup can be used in a second step to refill the evacuated between-pane space to a desired pressure and/or with a desired gaseous composition.

Two step processes of this nature are particularly advantageous in a number of respects. First, these processes can be used advantageously to precisely control the concentrations of gases within an IG unit. These processes also allow IG units to be filled with very high concentrations of insulative gas (e.g., by flowing the desired gas concentration through the hole immediately after vacuum establishment). These processes also facilitate efficient use of insulative gas, as only the necessary volume of gas is delivered through the hole 70. Finally, the entire process of vacuumizing and refilling the IG unit can be performed in a matter of minutes, thus being very efficient from the perspective of process time.

In certain embodiments, two or more holes are formed in the IG unit. For example, a gas inlet hole can be formed near a corner of one of the panes of an IG unit, and a gas outlet hole can be formed near another corner of that pane. These holes can be advantageously formed in diagonally-opposed corners of the pane. Insulative gas can then be forced into the inlet hole while existing gas (and eventually some of the introduced gas) escapes through the outlet hole. If so desired, this procedure can be accelerated by pulling a vacuum on the outlet hole, and/or by forcing the introduced gas into the inlet hole using a gas compressor or the like. In such methods, it may be desirable to measure the concentrations of gases flowing out of the outlet hole to determine the concentrations of gases inside the between-pane space. Once the desired concentrations are reached, pumping may be stopped.

In certain embodiments, the hole 70 is sealed once there has been established a desired interior pressure, a desired pressure differential, and/or a desired gaseous interior composition. In such embodiments, the hole 70 preferably is sealed permanently. It is to be understood that the terms "sealed permanently", "permanent seal", and the like are used herein to refer to a sealant that, once secured to the hole, completely blocks the hole unless it is removed entirely from the pane in which the hole is formed. Thus, a permanent sealant is not one that is designed to be selectively openable and closeable while still secured to the hole. For example, a valve that can be repeatedly opened and closed would not constitute a permanent sealant.

The hole 70 is preferably closed by positioning sealant in the hole 70. The sealant can be delivered to the hole 70 by any desired means. For example, a solid or semi-solid plug of material can be forced into the hole. The size of the plug desirably corresponds to the dimensions of the hole. For example, the plug is preferably cylindrical with a length equal to the thickness of the pane in which the hole is formed. In one embodiment, the plug is formed of a resilient material and the outer diameter of the plug is slightly greater than the inner diameter of the hole, such that when the plug is compressed slightly and inserted into the hole, the hole is sealed snugly by the plug. Alternatively, a rigid plug of material can be used and a bonding material can be applied to adhere the plug within the hole. As still another alternative, a wax, gel, or putty can be pressed or smeared into the hole, and the surplus wiped away.

Figure 8A:
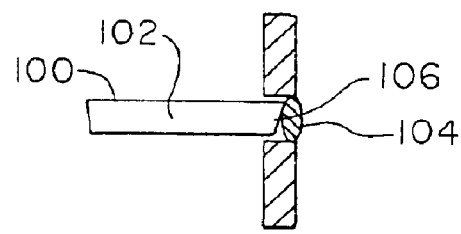
FIG. 8A is a detailed, cross-sectional side view of the hole of FIG. 5 depicted as sealant is being injected into the hole in accordance with certain embodiments of the invention.
Figure 8B:
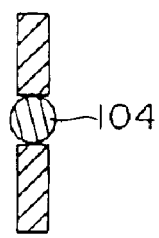
FIG. 8B is a detailed, cross-sectional side view of the hole of FIG. 5 depicted with sealant plugging the hole in accordance with certain embodiments of the invention.

In certain particularly preferred methods, sealant is injected into the hole 70. FIG. 8A illustrates a sealant delivery tube 100 (or "needle") having a lumen 102 extending therethrough to a distal tip 106. Sealant 104 can be injected through the needle 100 (which may be a syringe), and is seen in FIG. 8A to protrude from the distal tip 106 of the needle 100. In one method, the needle 100 is positioned within the hole 70 such that its tip 106 is adjacent the inner edge of the hole 70 (i.e., the edge of the hole at the inner surface 14 of the pane 10). Sealant 104 is then injected into the hole 70 as the needle 100 is withdrawn proximally (i.e., away from the between-pane space). Once the needle 100 is withdrawn to the point where its tip 106 has reached the outer edge of the hole 70 (i.e., the edge of the hole at the outer surface 12 of the first pane 10), injection may be stopped. Excess sealant can then be removed, for example, by scraping a razor blade or the like over the hole 70.

Figure 8C:
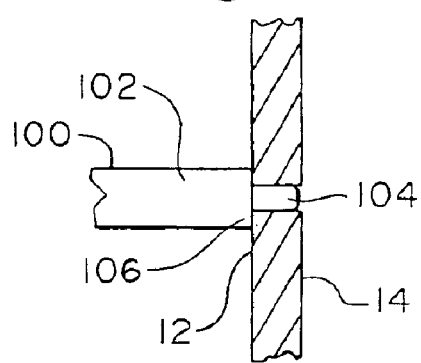
FIG. 8C is a detailed, cross-sectional side view of the hole of FIG. 5 depicted as sealant is being injected into the hole in accordance with certain embodiments of the invention.

In a particularly preferred method, the tip 106 of the needle 100 (e.g., which may be a syringe-like applicator) has a diameter slightly greater than that of the hole 70. In this method, the tip 106 of the needle is positioned against the outer surface 12 of the pane 10 about the hole 70 (as depicted in FIG. 8C), and injection is performed. Preferably, injection is performed until the sealant advances about halfway through the hole 70 (i.e., about halfway between the outer 12 and inner 14 surfaces of the pane 10). Alternatively, injection can simply be performed until the sealant 104 reaches the inner edge of the hole, substantially filling the entire hole 70. However, this may be difficult to do without some of the sealant 104 flowing beyond the inner edge of the hole and into the between-pane space. More preferably, once the sealant is injected about halfway through the hole 70, a bead (e.g., a drop) of sealant is deposited on the outer surface 12 of the pane 10 adjacent the hole 70. This bead of sealant is preferably fairly generous (e.g., about ⅛ inch to about ¼ inch in diameter). If so desired, a razor blade or the like can then be used to push this sealant over the hole 70, so as to substantially fill the hole with sealant, and to remove excess sealant, and to also leave the sealant substantially flush with the outer surface 12 of the pane 10. This may minimize the likelihood that the sealed hole 70' will have a distorted appearance. Generally speaking, the more flush the outer face of the sealant is with the outer surface of the pane, the less visible the filled hole 70' will be as a result of reflections. Thus, in certain embodiments, the outer portion (i.e., the outer face) of the finished sealant does not project (i.e., extend) substantially beyond the surface 12 of the pane 10. This may be particularly desirable, as it may decrease the likelihood that the finished sealant may be damaged during normal washing of the pane 10.

The sealant may be formed of a curable material, which solidifies or hardens upon curing. For example, the sealant can be formed of an anaerobic material which cures or polymerizes most rapidly in the absence of oxygen. A wide variety of anaerobic sealants are commercially available from a number of well known suppliers. Polyurethane acrylic sealants are believed to be particularly advantageous. Sealants of this nature are sold, for example, by Dymax Corporation, which is located in Torrington, Conn., U.S.A. One polyurethane acrylic sealant that has given good results is Dymax Corporation 429 Sealant.

When using an anaerobic sealant, it is preferable to minimize the amount of oxygen that reaches the sealant during curing. In such embodiments, the hole 70 is desirably covered following injection of the sealant into the hole 70. For example, a piece of tape, film, or the like can be secured over the sealant-filled hole to minimize the amount of oxygen that reaches the sealant during curing. This tape is preferably formed of material that is substantially impermeable to oxygen. For example, Mylar film has given good results, particularly two-inch-by-two-inch pieces of Mylar film. Preferably, the film is centered and applied on top of the sealant-filled hole, and is then gently pressed against the glass. When using the Dymax 429 sealant in this manner, the film-covered sealant is preferably cured for at least three minutes by centering an energized UV light (e.g., a battery-operated UV lamp) over the film-covered hole.

Thus, the sealant may be curable by exposure to radiation (e.g., UV radiation or visible light). In some cases, a visible light-curing sealant may be used. In such cases, curing may simply be accomplished by exposure to natural sunlight. As noted above, UV-curable sealant (e.g., UV-curable acrylic resin) can also be used, in which case a conventional UV lamp can be used to cure the sealant. For example, a portable battery-operated UV lamp (preferably with an extra battery pack and/or a charger) can be used. Lamps of this nature may be equipped with suctions cups or the like, which allow the lamp to be secured to the pane 10 such that the radiation of the lamp is oriented toward the sealant-filled hole. Ultraviolet lamps are available from a variety of commercial suppliers, including Dymax Corporation.

If a lamp is used to cure the sealant, then the lamp is preferably positioned adjacent the hole 70 and operated to initiate curing of the sealant. As noted above, a portable lamp of this nature may be equipped with suction cups, which facilitate attaching the lamp to the pane 10 in a configuration wherein the radiation of the lamp is focused on an area comprising the sealant-filled hole. Operation of the lamp is preferably continued until the sealant is cured. While curing time will vary for different sealants, many conventional curable plastic sealants will be cured after a few minutes of exposure to a conventional UV lamp. As noted above, curing of the Dymax Corporation 429 Sealant is complete after about three minutes or more of exposure to a conventional UV lamp. It is anticipated that in some embodiments the sealant will be formed of a multipart material which begins to cure upon mixing.

When a curable sealant is used (regardless of the curing mechanism), it may be preferable to finish the outer face of the sealant following curing. This can be done, for example, by running a clean razor blade or the like over the sealant-filled hole (e.g., after removing the Mylar film, if used). This is believed to be an effective way to remove any excess sealant from the hole. It is also believed to yield an outer sealant face that is as flush as possible with the outer surface 12 of the pane 10. At the end of the process, it may be preferable to clean the window (e.g., to use a window cleaner and a paper towel to clean the pane around the hole and where any suction cups have been applied to the pane).

In certain particularly advantageous embodiments, an optically clear sealant is used to fill the hole 70. In some embodiments, the sealant has an index of refraction that is substantially equal to that of the pane 10 in which the hole 70 is formed. In such embodiments, the sealed hole 70' may be nearly invisible, as noted above with reference to FIG. 13B. For example, it is particularly desirable to use sealant that is optically clear (transparent to translucent) to fill a hole in a glass pane. In such cases, the sealant preferably has an index of refraction of between about 1.3 and about 1.8, or perhaps more preferably between about 1.49 and about 1.65, or perhaps optimally between about 1.4 and about 1.55. Polymethyl methacrylate (PMMA) is believed to be particularly advantageous for sealing holes in glass. For example, the refractive index of PMMA is about 1.49, while that of soda lime glass is about 1.5.

Thus, one embodiment of the invention provides an IG unit comprising a pair of spaced-apart panes. In this embodiment, one of the panes has a hole formed therethrough. The hole is at least partially filled (and preferably is substantially entirely filled) with an optically clear sealant (e.g., a substantially transparent resin). In this embodiment, the panes of the IG unit are optionally formed of glass or another transparent material. The optically clear sealant can advantageously have a refractive index that is substantially equal to that of the material from which the panes are formed. In some cases, the panes are formed of glass and the optically clear sealant has a refractive index of between about 1.4 and about 1.55. The hole is not required to have any particular size in this embodiment. However, it is advantageous in some respects if the hole has a diameter of less than 0.0625 inch.

In certain embodiments, the sealant is formed of material that takes the form of a liquid or gel (e.g., that is flowable) at room temperature. Sealant of this nature is advantageously applied (e.g., flowed) into the hole 70 at a low temperature (i.e., at a temperature well below the melting point of soldering glass) or without any application of heat. For example, such sealant can be injected or otherwise flowed into the hole 70 while maintaining the sealant (and the pane 10) at room temperature.

The following sealants are expected to be useful for sealing the hole 70: polyester, one or two part epoxies, urethane, alpha methyl (or ethyl) cyano acrylate, alkyd, and liquid pre-polymers. One specific example of useful sealant material is a mixture of 7 parts by weight polyester acrylic, 3 parts by weight methyl methacrylate, 0.03 parts by weight benzoyl peroxide, 0.015 parts by weight benzoin, and 0.025 parts by weight vinyl methoxysilane. One useful sealant is commercially sold under the trade name PC 17 G by SNG Laboratories, Inc. (Fort Washington, Pa., U.S.A.).

In certain preferred embodiments, the hole 70 is sealed by filling at least a portion of the hole 70 with resin. The resin can advantageously be substantially transparent or optically clear (from transparent to translucent). This is particularly advantageous when the pane 10 (in which the hole 70 is formed) is transparent or translucent, such as when the pane 10 is glass (e.g., soda lime glass). The resin may comprise a variety of known clear viscous substances, for example, of plant origin (e.g., comprising copal, rosin, amber, etc.) or physically similar polymerized synthetics or chemically modified natural resins including thermoplastic materials such as polyvinyl, polystyrene, and polyethylene and thermosetting materials such as polyesters, epoxies, and silicones. In certain cases, the resin belongs to the class of solid and semisolid materials that are soluble in ether, alcohol, and essential oils, but not in water, such as known resins obtained either as exudations from certain plants or prepared by polymerization of simple molecules. A variety of useful resins are sold by Liquid Resins International, Ltd., which is located in Olney, Ill., U.S.A.

Many suitable resins have been used for years in repairing damaged automobile windshields. Some of these resins are disclosed in U.S. Pat. Nos. 3,993,520, 4,497,476, 5,069,836, and 6,190,150, the entire teachings of each of which are incorporated herein by reference. Resins of this nature are believed to be desirable for use in the present methods. Reference is also made to these four patents for their disclosure of useful methods and devices for applying such resins.

In one embodiment, the invention provides a method of servicing an IG unit by sealing a hole formed through one of the panes of the unit. In this method, there is provided an IG unit that includes a pair of spaced-apart panes at least one of which has therein formed a hole. The method comprises sealing the hole with a substantially transparent resin (e.g., of the described nature). In this method, the resin can be delivered to the hole in any desired way, although injection is particularly preferred. In this method, the hole may advantageously have a diameter of less than 0.0625 inch, although this is by no means a requirement.

In certain preferred embodiments, the sealant is a non-vitreous material. In cases where the sealant is optically clear, the sealant is preferably non-metallic. Moreover, the sealed hole 70' in certain embodiments contains only a deposit of clear sealant material (e.g., it is devoid of any discrete plug, capsule, valve, vent, etc.). Preferably, the sealant is not significantly perforated (e.g., it may contain no perforations or other openings), such that it is impermeable to water vapor. In certain embodiments, the hole 70 is sealed exclusively with optically clear material (e.g., the sealed hole 70' may be entirely free of opaque material), so as to provide an all-transparent closure of the hole 70. Thus, the sealed hole 70' may advantageously be entirely transparent.

As noted above, one aspect of the invention provides methods for upgrading IG units. For example, the insulating value of an existing IG unit can sometimes be increased by providing a better gas fill. For example, if an existing IG unit simply contains air, then the insulative value of that unit can be increased by replacing the air with a more insulative gaseous composition (e.g., a mixture of air and argon, or air and krypton). Similarly, an IG unit that initially contains a first gas fill (which may contain less insulative gas than desired, and/or a less desirable composition of gases, such as argon and air) may be upgraded to a second gas fill (which may contain more insulative gas than the first gas fill, and/or a more desired composition of gases, such as krypton and air). In another aspect of the invention, IG units may be upgraded for aesthetic purposes. For example, water vapor may infiltrate an IG unit, causing visible fogging within the between-pane space. In such cases, desiccated gas can be advantageously flowed into the between-pane space. In one procedure, a hole is drilled through one of the panes of an IG unit and desiccated air is forced into the hole, until existing moisture-laden air is substantially purged. If so desired, a deposit of desiccant can alternatively or additionally be inserted through the hole 70 and left in the between-pane space 115. After filling the between-pane space with insulative gas and/or desiccant, the hole 70 can be sealed, as previously described. Thus, the present methods can be used to provide improved insulating properties for older IG units without having to replace those units altogether.

In still another embodiment of the invention, there is provided a simplified method for filling IG units with insulative gas. In this method, once an IG unit has been assembled, a hole is formed in one of the panes of the unit. In an alternative method, the hole 70 is formed in one of the panes prior to, or during, assembly of the panes into an IG unit. As still another alternative, an IG unit having a hole formed in one of its panes can simply be provided. In the present embodiment, the IG unit is filled with insulative gas by flowing (e.g., forcing) such gas through the hole and into the between-pane space of the unit. Once the IG unit reaches a desired fill level, the hole can be sealed. Each of these steps is performed in accordance with the foregoing disclosure. Thus, the present embodiment provides a very simple method of producing an IG unit with an insulative gas fill. This method can be practiced on a unit-by-unit basis, or it can be incorporated into a high volume production system, wherein a plurality of IG units can be thus produced without the need for sophisticated and expensive gas-filling equipment.

This method of filling IG units with insulative gas provides particularly efficient use of insulative gas. For example, high volume production systems may involve sophisticated gas-filling equipment in which a partially assembled IG unit is conveyed into a gas-filling chamber. The chamber may then be vacuumized and the entire ID volume of the chamber flooded with insulative gas. Thus, it can be appreciated that only a portion of the gas delivered to such a chamber actually fills the IG unit in each operation. While efforts can be made to recycle the rest of the gas, some of the insulative gas is typically lost when the chamber is opened to allow egress of the filled IG unit. Thus, the efficiency of the present method in terms of insulative gas expenditure is quite advantageous, particularly when a costly gas like krypton is used.

In another aspect of the invention, an IG unit is assembled without an insulative gas fill (i.e., the IG unit simply contains air). The manufacturer then forms a hole 70 through one of the panes of the unit. Alternatively, the hole 70 can be formed through one of the panes before assembling them into an IG unit. The IG unit is then transported to a customer (e.g., a homeowner, a builder or contractor, or a frame manufacturer who assembles the IG unit into a sash and/or frame) or to a building site in the condition just described. If so desired, the IG unit can be transported along with a servicing kit that includes a supply of insulative gas (for filling the between-pane space of the unit) and a supply of sealant (for sealing the hole 70). The sealant is preferably of the nature described above (e.g., optically transparent, etc.). The servicing kit may also include any one or more of the following components: a sealant injector (e.g., a syringe); a substantially oxygen impermeable film (e.g., Mylar film); UV curing lamp (e.g., portable and battery operated); razor blades; gap gauge (as described above); vacuum pump; gas compressor; and safety glasses. The customer can then fill the IG unit with the insulative gas, and seal the hole with the sealant, on his or her own. Alternatively, a service technician in the field can fill the unit with insulative gas, and seal the hole, for the customer. This method could be used advantageously when the IG unit is manufactured at one elevation and then delivered to a customer at another elevation, as the IG unit could be filled to whatever interior pressure is desired, for example, taking into account the elevation/local atmospheric pressure at which the IG unit is installed.

In still another aspect of the invention, an IG unit is assembled without an insulative gas fill. The IG unit is then transported to a customer or to a building site along with a servicing kit that includes a supply of insulative gas and a supply of sealant. The servicing kit may also include any one or more of the following components: a hole-forming device (e.g., a drill and one or more drill bits, as described above); a sealant injector (e.g., a syringe); a substantially oxygen impermeable film (e.g., Mylar film); UV curing lamp (e.g., portable and battery operated); razor blades; gap gauge (as described above); vacuum pump; gas compressor; and safety glasses. Thereafter, the customer, or a service technician in the field, can form a hole 70 through one of the panes and then flow the provided insulative gas through the hole 70 and into the between-pane space of the IG unit. Once the desired fill level is reached, the hole 70 can be sealed with the provided sealant. All of these steps can be performed in accordance with the teachings herein. This method allows the IG unit to ultimately be filled to whatever interior pressure is desired upon installation, for example, taking into account the elevation at which the unit is installed.

In yet another aspect of the invention, the manufacturer assembles an IG unit and forms a hole 70 through one of the panes of the unit. The manufacturer then flows insulative gas through the hole 70 and into the between-pane space of the IG unit. Once the IG unit is filled to the desired fill level, a temporary sealant is applied to the hole. For example, the hole can be temporarily/reversibly sealed by covering the hole with a removable adhesive tape, plug, or the like. Desirably, the temporary sealant keeps moisture from entering the hole and getting into the between-pane space (i.e., the temporary sealant is preferably substantially impermeable to moisture). Further, the temporary sealant desirably keeps the insulative gas in the between-pane space from escaping through the hole (i.e., the temporary sealant is preferably substantially impermeable to the insulative gas). The temporary sealant should also be sufficiently permanent and durable to retain these properties until the IG unit arrives at a job site. In one embodiment, the IG unit is transported to the customer, or to a building site, in the condition just described. If so desired, the IG unit can be transported along with a supply of sealant (as described above). Further, one or more of the following components can also be transported along with the IG unit; a sealant injector (e.g., a syringe); a substantially oxygen impermeable film (e.g., Mylar film); UV curing lamp (e.g., portable and battery operated); razor blades; gap gauge (as described above); a supply of insulative gas; vacuum pump; gas compressor; safety glasses, etc. The provided sealant can be used subsequently by the customer, or by a service technician in the field, to seal the hole 70.

The present invention also provides a number of kits that can be used to service IG units. If so desired, the components of each kit can be packaged together or otherwise placed in a bundle, and optionally transported to a customer or to a building site in this condition. One particular kit includes the following: a device adapted for forming holes in the panes of IG units (e.g., a drill equipped with one or more drill bits, as described above); a supply of insulative gas (e.g., a supply of argon, krypton, or a desired gas mix); and a supply of sealant (e.g., of the nature described above). In one embodiment, the hole-forming device is adapted to form a hole having a diameter on the order of about $\frac{1}{16}$ inch or less. For example, the hole-forming device may include a bit (optionally including a stop) having a diameter of $\frac{1}{16}$ inch or less. In certain embodiments, the hole-forming device is suitable for forming holes in glass panes. This kit may also include any one or more of the following components: a sealant injector, such as a syringe (e.g., a sealant delivery tube/needle preferably having a diameter that is either slightly greater than, or slightly less than, the hole diameter the hole-forming device is adapted to create); a sealant curing device (e.g., a UV lamp of the nature described above); a vacuum pump; a gas compressor; an air duster or the like (also described above); a supply of substantially oxygen impermeable film (e.g., Mylar film); a gap gauge (described above); razor blades; and safety glasses. In certain embodiments, one or more of these kits are transported (e.g., to a customer or to a building site) with an IG unit, or with a batch of IG units.

Another kit of the invention includes the following: an insulating glass unit having a hole 70 formed in one of the panes of the unit (or a batch of such IG units); a supply of insulative gas for filling the between-pane space of the unit or units; and a supply of sealant for ultimately sealing the hole 70 in each IG unit. This kit may optionally include any one or more of the following: a sealant injector; a sealant curing device; a vacuum pump; a gas compressor; a supply of substantially oxygen impermeable film; razor blades; a gap gauge; and safety glasses.

Still another kit of the invention includes the following: an IG unit containing an insulative gas fill and having a temporarily-sealed (as described above) hole 70 formed in one of the panes of the unit (or a batch of such IG units); and a supply of sealant for permanently sealing the hole 70 in each unit. This kit may optionally include any one or more of the following components: a sealant injector; a sealant curing device; a supply of substantially oxygen impermeable film; a vacuum pump; a gas compressor; a supply of insulative gas; a gap gauge; razor blades; and safety glasses.

In a further aspect of the invention, an IG unit is manufactured such that it contains an insulative gas fill. The IG unit is then transported from a first location (e.g., from the IG unit assembly plant) having a first local atmospheric pressure (e.g., at a first elevation) to a second location (e.g., at a second, higher elevation) having a second local atmospheric pressure that is lower than that at the first location. If so desired, the IG unit (or a batch of such IG units) can be transported along with any one or more of the following components: a device adapted for forming holes in the panes IG units (e.g., a drill equipped with one or more drill bits, as described above); a supply of insulative gas (e.g., a supply of argon, krypton, or a desired gas mix); a supply of sealant (e.g., of the nature described above); a sealant injector, such as a syringe (e.g., a sealant delivery tube/needle preferably having a diameter that is either slightly greater than, or slightly less than, the hole diameter the hole-forming device is adapted to create); a sealant curing device (e.g., UV lamp of the nature described above); a vacuum pump; a gas compressor; an air duster or the like (also described above); a supply of substantially oxygen impermeable film (e.g., Mylar film); a gap gauge (described above); razor blades; and safety glasses. Upon reaching the second location, the IG unit will effectively be over-pressured (i.e., it will experience a positive pressure differential), since the internal pressure is greater than the external atmospheric pressure. A hole 70 is then formed in one of the panes of the IG unit. The open hole can then be allowed to vent (i.e., the open hole 70 can be kept exposed to the ambient atmosphere) until the pressure differential is eliminated or reduced to a desired level.

In still another aspect of the invention, there is provided a method of servicing an IG unit. The IG unit may have the structure described herein, or any other desired structure. In this aspect, a hole 70 is formed through one of the panes. Prior to forming this hole 70, the between-pane space of the IG unit contains a first gaseous interior pressure. Following hole formation, gas is flowed through this hole 70 to change the first gaseous interior pressure to a second gaseous interior pressure. The gas may be forced to flow through the hole 70, or this gas flowing may simply be allowed to occur by venting the hole 70 to the ambient exterior atmosphere 132. In certain embodiments, this gas is flowed into the between-pane space, such that the second gaseous interior pressure is higher than the first gaseous interior pressure. In one particular embodiment of this nature, this gas is flowed into the between-pane space prior to or during a cold season to increase the first gaseous interior pressure to the second gaseous interior pressure. In other embodiments, the gas is flowed out of the between-pane space of the IG unit, such that the second gaseous interior pressure is lower than the first gaseous interior pressure. In one particular embodiment of this nature, this gas is flowed out of the between-pane space prior to or during a warm season to decrease the first gaseous interior pressure to the second gaseous interior pressure. Thus, the invention also provides seasonal servicing methods of increasing the pressure within an IG unit prior to or during the winter and/or decreasing the pressure within an IG unit prior to or during summer.

In a further aspect of the invention, a hole formed according to the present invention can be used to detect a leak in an IG unit. For example, an opaque gas can be forced through the hole and into the between-pane space of an IG unit. The opaque gas can be supplied at a greater-than-atmospheric pressure to facilitate leak detection. Once the between-pane space is filled with the opaque gas, the IG unit is observed for leakage of the opaque gas. This method may be useful in detecting small leaks that cannot be readily detected by visual inspection. It is expected that any of a variety of known opaque gases can be used. For example, opaque smoke has been used for years to detect leaks in pipes. Reference is made to U.S. Pat. Nos. 5,107,698, 5,753,800, 5,859,363, 5,922,944, 6,018,615, and 6,142,009, the entire teachings of each of which are incorporated herein by reference. In this embodiment, the "opaque" gas may actually be a translucent or otherwise visible gas.

While specific embodiments of the present invention have been described, it should be understood that various changes, adaptations and modifications may be made therein without departing from the spirit of the invention and the scope of the appended claims.

What is claimed is:

1. A method of servicing an insulating glass unit, wherein the insulating glass unit includes a pair of spaced-apart panes and a spacer joining peripheral confronting inner surfaces of the panes, the spacer and the confronting inner surfaces of the panes together defining a between-pane space containing a gaseous interior composition at an interior pressure that is different than the ambient exterior pressure outside the panes, such that a pressure differential exists between the interior pressure and the exterior pressure, the method comprising:

a. forming a hole through one of the panes;

b. flowing gas through said hole to reduce said pressure differential; and c. sealing said hole by flowing sealant into said hole, wherein the sealant flowed into said hole is a substantially transparent resin.

2. A method as in claim 1 wherein said gas is forced to flow through said hole.

3. A method as in claim 1 wherein said gas is allowed to flow through said hole by venting said hole to the ambient exterior atmosphere.

4. A method as in claim 1 wherein said interior pressure is less than said exterior pressure prior to forming said hole, and said gas is flowed into the between-pane space of the insulating glass unit.

5. A method as in claim 4 wherein said gas is forced to flow into the between-pane space.

6. A method as in claim 4 comprising evacuating the between-pane space prior to flowing said gas into the between-pane space.

7. A method as in claim 4 wherein said gas comprises desiccated air.

8. A method as in claim 4 wherein said gas comprises an insulative gas.

9. A method as in claim 8 wherein said insulative gas is argon.

10. A method as in claim 8 wherein said insulative gas is krypton.

11. A method as in claim 1 wherein said interior pressure is greater than said exterior pressure prior to forming said hole, and said gas is flowed out of the between-pane space of the insulating glass unit.

12. A method as in claim 11 wherein said gas is forced to flow out of the between-pane space.

13. A method as in claim 1 wherein the sealant has an index of refraction that is substantially equal to that of the pane in which said hole is formed.

14. A method as in claim 1 wherein the sealant is flowed into said hole by injecting the sealant into said hole.

15. A method as in claim 1 wherein the sealant is a curable sealant, the method further comprising curing the sealant.

16. A method as in claim 15 wherein said curing includes applying ultraviolet radiation.

17. A method as in claim 15 wherein the curable sealant is a polymeric material.

18. A method as in claim 17 wherein the polymeric material comprises polyurethane acrylic.

19. A method as in claim 15 wherein the curable sealant has an index of refraction after curing that is substantially equal to that of the pane in which said hole is formed.

20. A method as in claim 1 wherein said hole is formed by drilling, said hole taking the form of a cylindrical aperture, wherein said hole has an interior wall that is generally perpendicular to the inner surface of the pane in which said hole is formed.

21. A method of servicing an insulating glass unit, wherein the insulating glass unit includes a pair of spaced-apart panes and a spacer joining peripheral confronting inner surfaces of the panes, the spacer and the confronting inner surfaces of the panes together defining a between-pane space containing a first gaseous interior composition, the method comprising:
    a. forming a first hole through one of the panes;
    b. flowing gas through said first hole to establish a second gaseous interior composition within the between-pane space of the insulating glass unit; and
    c. sealing said first hole by injecting sealant into said first hole.

22. A method as in claim 21 wherein said gas is forced to flow through said first hole.

23. A method as in claim 21 wherein said gas is allowed to flow through said first hole by venting said first hole to the ambient exterior atmosphere.

24. A method as in claim 21 wherein said gas is flowed into the between-pane space of the insulating glass unit.

25. A method as in claim 24 wherein said gas is forced to flow into the between-pane space.

26. A method as in claim 24 comprising evacuating the between-pane space prior to flowing said gas into the between-pane space.

27. A method as in claim 24 wherein said gas comprises desiccated air.

28. A method as in claim 24 wherein said gas comprises an insulative gas.

29. A method as in claim 28 wherein the insulative gas is argon.

30. A method as in claim 28 wherein the insulative gas is krypton.

31. A method as in claim 21 wherein said first hole is formed by drilling, said hole taking the form of a cylindrical aperture, wherein said hole has an interior wall that is generally perpendicular to the inner surface of the pane in which said hole is formed.

32. A method as in claim 21 further comprising delivering a desiccant through said first hole and into the between-pane space of the insulating glass unit before said first hole is sealed.

33. A method as in claim 21 further comprising forming a second hole through one of the panes of the insulating glass unit before said first hole is sealed.

34. A method as in claim 33 wherein said gas is forced to flow into said first hole while gas is allowed to flow out of said second hole.

35. A method as in claim 34 further comprising measuring the concentration of gas flowing out of said second hole.

36. A method as in claim 33 further comprising sealing said second hole after establishing said second gaseous interior composition.

37. A method of servicing an insulating glass unit, wherein the insulating glass unit includes a pair of spaced-apart panes and a spacer joining peripheral confronting inner surfaces of the panes, the spacer and the confronting inner surfaces of the panes together defining a between-pane space having a first gaseous interior pressure, the method comprising:
    a. forming a hole through one of the panes, said hole having a diameter of between about 0.1 inch and about 0.4 inch;
    b. flowing gas through said hole to change said first gaseous interior pressure to a second gaseous interior pressure; and
    c. sealing said hole by injecting sealant into said hole.

38. A method as in claim 37 wherein said gas is forced to flow through said hole.

39. A method as in claim 37 wherein said gas is allowed to flow through said hole by venting said hole to the ambient exterior environment.

40. A method as in claim 37 wherein said gas is flowed into the between-pane space of the insulating glass unit, such that said second gaseous interior pressure is higher than said first gaseous interior pressure.

41. A method as in claim 40 wherein said gas is forced to flow into the between-pane space.

42. A method as in claim 40 comprising evacuating the between-pane space prior to flowing said gas into the between-pane space.

43. A method as in claim 40 wherein said gas comprises desiccated air.

44. A method as in claim 40 wherein said gas comprises an insulative gas.

45. A method as in claim 44 wherein the insulative gas is argon.

46. A method as in claim 44 wherein the insulative gas is krypton.

47. A method as in claim 40 wherein said gas is flowed into the between-pane space prior to or during a cold season to increase said first gaseous interior pressure to said second gaseous interior pressure.

48. A method as in claim 37 wherein said gas is flowed out of the between-pane space of the insulating glass unit, such that said second gaseous interior pressure is lower than said first gaseous interior pressure.

49. A method as in claim 48 wherein said gas is forced to flow out of the between-pane space.

50. A method as in claim 48 wherein said gas is flowed out of the between-pane space prior to or during a warm season to decrease said first gaseous interior pressure to said second gaseous interior pressure.

51. A method as in claim 37 wherein the sealant is an optically clear sealant.

52. A method of servicing an insulating glass unit, wherein the insulating glass unit includes a pair of spaced-apart panes and a spacer joining peripheral confronting inner surfaces of the panes, the spacer and the confronting inner surfaces of the panes together defining a between-pane space, the method comprising:
   a. forming a hole through one of the panes;
   b. flowing insulative gas through said hole and into the between-pane space of the insulating glass unit; and
   c. sealing said hole by filling said hole substantially entirely with an optically clear sealant, the hole being filled by flowing the sealant into said hole at a temperature below the melting point of solder glass.

53. A method as in claim 52 comprising evacuating the between-pane space before flowing said insulative gas into the between-pane space.

54. A method as in claim 53 wherein the between-pane space is evacuated by placing a suction device in communication with said hole.

55. A method as in claim 52 wherein said insulative gas is forced to flow through said hole.

56. A method as in claim 55 wherein said insulative gas is forced to flow through said hole by placing a pressurized supply of said insulative gas in communication with said hole.

57. A method as in claim 52 wherein said insulative gas is argon.

58. A method as in claim 52 wherein said insulative gas is krypton.

59. A method of servicing an insulating glass unit, wherein the insulating glass unit includes a pair of spaced-apart panes and a spacer joining peripheral confronting inner surfaces of the panes, the spacer and the confronting inner surfaces of the panes together defining a between-pane space, at least one of the panes of the insulating glass unit having a hole formed therethrough, the method comprising sealing said hole by flowing sealant into said hole, wherein the sealant flowed into said hole is a substantially transparent resin, and wherein said resin is flowed into said hole while maintaining the resin at room temperature.

60. A method as in claim 59 wherein said resin is flowed into said hole by injecting said resin into said hole.

61. A method as in claim 60 wherein said resin is injected using a syringe-like applicator.

62. A method of servicing an insulating glass unit, wherein the insulating glass unit includes a pair of spaced-apart panes and a spacer joining peripheral confronting inner surfaces of the panes, the spacer and the confronting inner surfaces of the panes together defining a between-pane space, the method comprising:
   a. forming a hole having a diameter of less than 0.0625 inch through one of the panes;
   b. flowing gas through said hole; and
   c. sealing said hole with an optically clear sealant by injecting the sealant into said hole using a needle.

63. A method of servicing an insulating glass unit, wherein the insulating glass unit includes a pair of spaced-apart panes and a spacer joining peripheral confronting inner surfaces of the panes, the spacer and the confronting inner surfaces of the panes together defining a between-pane space, the method comprising:
   a. forming a hole through one of the panes;
   b. flowing gas through said hole; and
   c. sealing said hole by flowing a liquid or gel sealant into said hole, wherein the sealant is flowed into said hole without application of heat.

64. A method of servicing an insulating glass unit, wherein the insulating glass unit includes a pair of spaced-apart panes and a spacer joining peripheral confronting inner surfaces of the panes, the spacer and the confronting inner surfaces of the panes together defining a between-pane space, the method comprising:
   a. forming a hole through one of the panes;
   b. flowing gas through said hole; and
   c. sealing said hole by flowing sealant into said hole, the sealant being a non-vitreous, non-metallic, clear sealant, such that the sealed hole contains only a deposit of the clear sealant providing an all-transparent closure of said hole, and wherein the sealant does not contain any perforations or other openings.

65. A method of servicing an insulating glass unit, wherein the insulating glass unit includes a pair of spaced-apart panes and a spacer joining peripheral confronting inner surfaces of the panes, the spacer and the confronting inner surfaces of the panes together defining a between-pane space, the insulating glass unit being mounted in a wall of a building when the method is performed, the method comprising:
   a. forming a hole through one of the panes of said mounted insulating glass unit;
   b. flowing gas through said hole; and
   c. sealing said hole by injecting a sealant into said hole, thereafter applying a bead of the sealant to an outer surface of the pane in which said hole is formed, said bead being applied adjacent said hole, and pushing said bead of sealant over said hole so as to substantially fill said hole with the sealant and to remove excess sealant and to also leave the sealant substantially flush with said outer surface.

66. A method of servicing an insulating glass unit, wherein the insulating glass unit includes a pair of spaced-apart panes and a spacer joining peripheral confronting inner surfaces of the panes, the spacer and the confronting inner surfaces of the panes together defining a between-pane space, the method comprising:
   a. forming a hole through one of the panes, the hole having a diameter of less than about 0.03125 inch;
   b. flowing gas through said hole; and
   c. sealing said hole with an optically clear sealant.

* * * * *